US012298687B2

(12) United States Patent
Eguchi et al.

(10) Patent No.: US 12,298,687 B2
(45) Date of Patent: May 13, 2025

(54) IMAGE FORMING APPARATUS WITH CONTROL OF TRANSFER VOLTAGE

(71) Applicant: CANON KABUSHIKI KAISHA, Tokyo (JP)

(72) Inventors: Hiroki Eguchi, Kanagawa (JP); Yusaku Iwasawa, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/371,586

(22) Filed: Sep. 22, 2023

(65) Prior Publication Data

US 2024/0103409 A1 Mar. 28, 2024

(30) Foreign Application Priority Data

Sep. 24, 2022 (JP) ................................ 2022-152041

(51) Int. Cl.
*G03G 15/16* (2006.01)

(52) U.S. Cl.
CPC ................................ *G03G 15/1675* (2013.01)

(58) Field of Classification Search
USPC ............................................................ 366/66
See application file for complete search history.

(56) References Cited

U.S. PATENT DOCUMENTS 8,977,150 B2 3/2015 Yamamoto et al.
11,435,675 B2 9/2022 Kanal et al.
2021/0063920 A1 * 3/2021 Kobayashi ......... G03G 15/1675

FOREIGN PATENT DOCUMENTS

JP 2013-117591 A 6/2013
JP 2015-068924 A 4/2015
JP 2015-075678 A 4/2015
JP 2020-160361 A 10/2020

* cited by examiner

*Primary Examiner* — Quana Grainger
(74) *Attorney, Agent, or Firm* — Venable LLP

(57) ABSTRACT

A controller of an image forming apparatus controls a transfer voltage applying portion so that a voltage is not applied to a transfer member or a voltage of an opposite polarity to a normal charge polarity of toner is applied to the transfer member, in a first period including at least a period, after rotation of a photosensitive member and a developing member, from first arrival of a first region at a transfer portion to first arrival of a second region at the transfer portion, and so that at least a first voltage of the same polarity as the normal charge polarity and a second voltage of the same polarity as the first voltage and larger in absolute value than the first voltage are applied to the transfer member in a second period after the first period and before a toner image reaches the transfer portion.

10 Claims, 12 Drawing Sheets

IMAGE FORMING APPARATUS WITH CONTROL OF TRANSFER VOLTAGE

FIELD OF THE INVENTION AND RELATED ART

The present invention relates to an image forming apparatus, such as a laser beam printer, a copying machine, or a facsimile machine, of an electrophotographic type.

Conventionally, for example, in the image forming apparatus such as the laser beam printer of the electrophotographic type, a surface of a photosensitive drum as an image bearing member is electrically charged uniformly to a dark-portion potential by a charging means. Thereafter, the charged surface of the photosensitive drum is exposed to light by an exposure means, so that a light-portion potential is formed on the surface of the photosensitive drum. By this, an electrostatic latent image is formed on the surface of the photosensitive drum by a contrast between the dark-portion potential and the light-portion potential. Then, to the electrostatic latent image formed on the photosensitive drum, toner is supplied by a developing means, so that a toner image is formed on the photosensitive drum. As a developing member constituting the developing means, a developing roller is used in general. The developing roller forms a nip in contact with the photosensitive drum and supplies, to the photosensitive drum, the toner in a developing container while being rotated.

The toner image formed on the photosensitive drum is transferred onto the recording material by a transfer means. As a transfer member constituting the transfer means, a transfer roller is used in general. The transfer roller forms a nip ("transfer nip") in contact with the photosensitive drum, and transfers the toner from the photosensitive drum onto the recording material while feeding the recording material by being rotated. At this time, to the transfer roller, a transfer voltage of an opposite polarity to a normal charge polarity of the toner is applied, so that the toner image on the image bearing member is electrostatically transferred onto the recording material. Thereafter, the toner image transferred on the recording material is heated and pressed by a fixing means, and thus is fixed on the recording material.

Incidentally, the recording material is referred to as "paper" in some instances, but the recording material may also be synthetic paper or a film formed of a material principally comprising a synthetic resin, or may also be formed of a material, other than the paper, such as metallized paper (special paper) having a metal layer, or a material containing the material other than the paper. Further, for convenience, in the case where no specific mention is made, a magnitude (high/low, strong/weak) of a potential, a voltage, or a current refer to those in the case where these values are compared in terms of an absolute value. Further, for the recording material, a "leading end" and a "trailing end" refer to the leading end and the trailing end with respect to a feeding direction of the recording material.

In the image forming apparatus as described above, a phenomenon called a "fog at startup" occurs in some instances.

The "fog at startup" is a phenomenon such that when the image forming apparatus is started up after a lapse of a long time from an end of a last print (printing) operation, a part of the toner held on the developing roller is transferred onto the photosensitive drum although there is no electrostatic latent image on the photosensitive drum. This phenomenon occurs due to that a potential difference between the photosensitive drum and the developing roller cannot be maintained by a lowering in surface potential of the photosensitive drum by the lapse of the long time and that an electric charge of the toner on the developing roller lowers by the lapse of the long time.

A general means for suppressing the "fog at startup" is that the developing roller is separated from the photosensitive drum at startup of the image forming apparatus. When the developing roller is separated from the photosensitive drum, the toner on the developing roller is not transferred onto the photosensitive drum. However, provision of a contact and separation mechanism for switching contact and separation of the developing roller relative to the photosensitive drum in the image forming apparatus leads to upsizing and an increase in cost.

In Japanese Laid-Open Patent Application 2013-117591, reduction in amount of the toner transferred from the developing roller to the photosensitive drum by generating a potential difference between the photosensitive drum and the developing roller under application of a voltage of an opposite polarity to a normal charge polarity to the developing roller is proposed.

However, in the toner on the developing roller after the lapse of the long time from the end of the last print operation, toner with no electric charge and toner of which polarity is reversed to the opposite polarity to the normal charge polarity of the toner are contained in a large amount. For that reason, it is difficult to completely prevent the fog at startup only by the potential difference between the photosensitive drum and the developing roller.

When such toner caused the fog at startup (hereinafter, also referred to as "fog toner") passes through the transfer nip, toner scattering occurs from the transfer nip. By this toner scattering, a contaminant by the toner is deposited on members, such as a discharging needle and a feeding guide, provided downstream of the transfer nip with respect to the feeding direction of the recording material. The fog at startup occurs repetitively, so that the contaminant by this toner is accumulated gradually.

SUMMARY OF THE INVENTION

A principal object of the present invention is to provide an image forming apparatus capable of suppressing toner scattering caused by toner which caused a fog at startup.

This object is achieved by an image forming apparatus according to the present invention.

One aspect of the present invention is to provide an image forming apparatus comprising: a rotatable photosensitive member; a charging member configured to electrically charge the photosensitive member at a charging portion; a rotatable developing member configured to supply toner to the photosensitive member, charged by the charging member, in contact with the photosensitive member at a developing portion; a regulating member configured to impart an electric charge to the toner on the developing member in contact with the developing member at a regulating portion; a transfer member forming a transfer portion in contact with the photosensitive member and configured to transfer the toner from the photosensitive member onto a recording material passing through the transfer portion; a transfer voltage applying portion configured to apply a voltage to the transfer member; and a controller capable of controlling the transfer voltage applying portion, wherein rotation of the photosensitive member and the developing member is started in a state in which the photosensitive member and the developing member are in contact with each other, wherein a region on the photosensitive member positioned at the developing portion during a stop of the rotation of the photosensitive member and the developing member is defined as a first region, and a region on the photosensitive member first contacting, at the developing portion, a region on the developing member positioned at the regulating portion during the stop of the rotation of the photosensitive member and the developing member after the rotation of the photosensitive member and the developing member is started is defined as a second region, and wherein the controller controls the transfer voltage applying portion, so that the voltage is not applied to the transfer member or a voltage of an opposite polarity to a normal charge polarity of the toner is applied to the transfer member, in a first period including at least a period, after the rotation of the photosensitive member and the developing member is started, from first arrival of the first region at the transfer portion to first arrival of the second region at the transfer portion, and so that at least a first voltage of the same polarity as the normal charge polarity and a second voltage which is of the same polarity as the first voltage and which is larger in absolute value than the first voltage are applied to the transfer member in a second period after the first period and before a toner image formed on the photosensitive member reaches the transfer portion.

Further features of the present invention will become apparent from the following description of exemplary embodiments with reference to the attached drawings.

Figure 2:
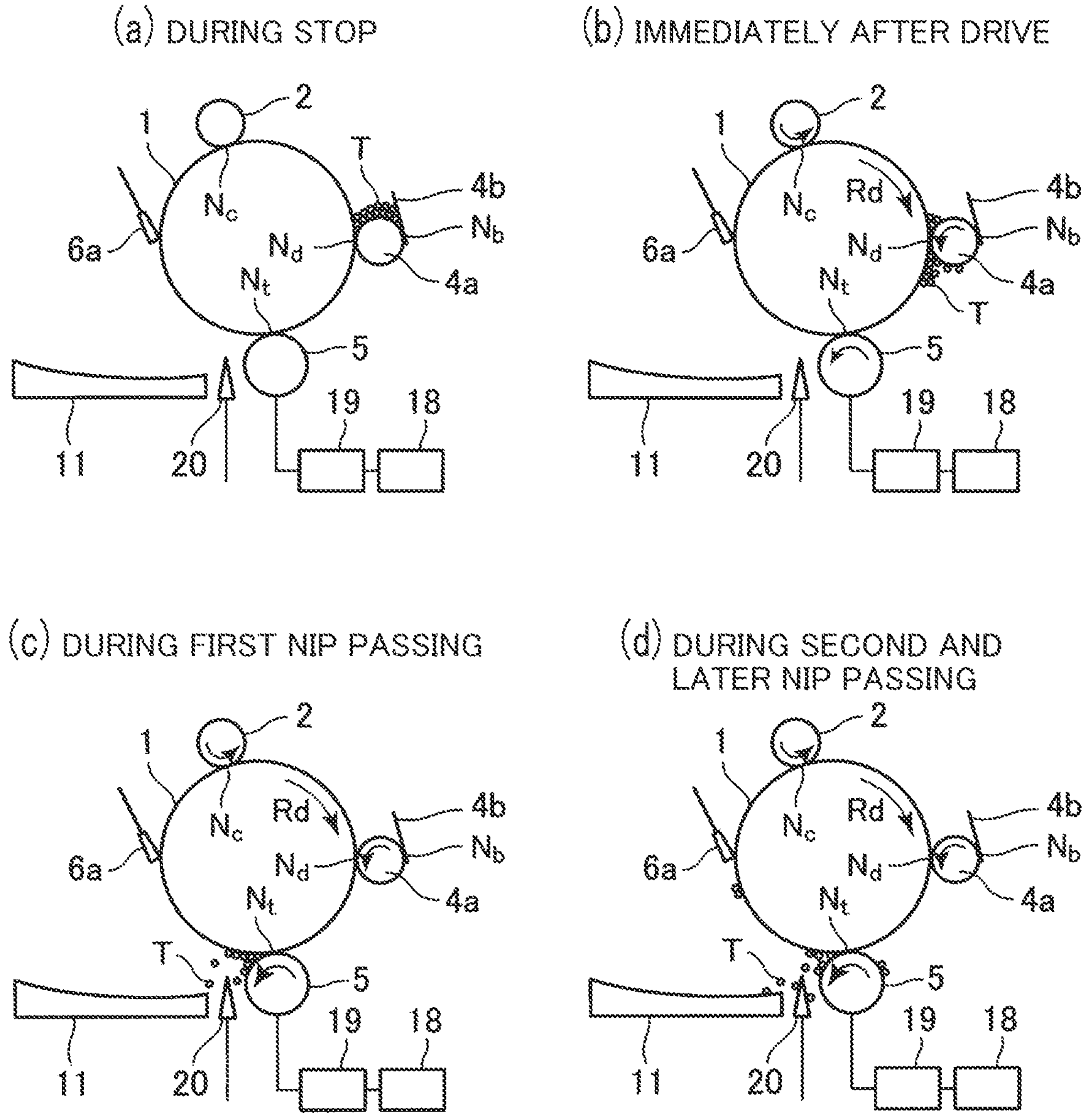

Parts (a) to (d) of FIG. 2 are schematic views for illustrating an occurrence mechanism of toner scattering due to a fog at startup.

Figure 3:
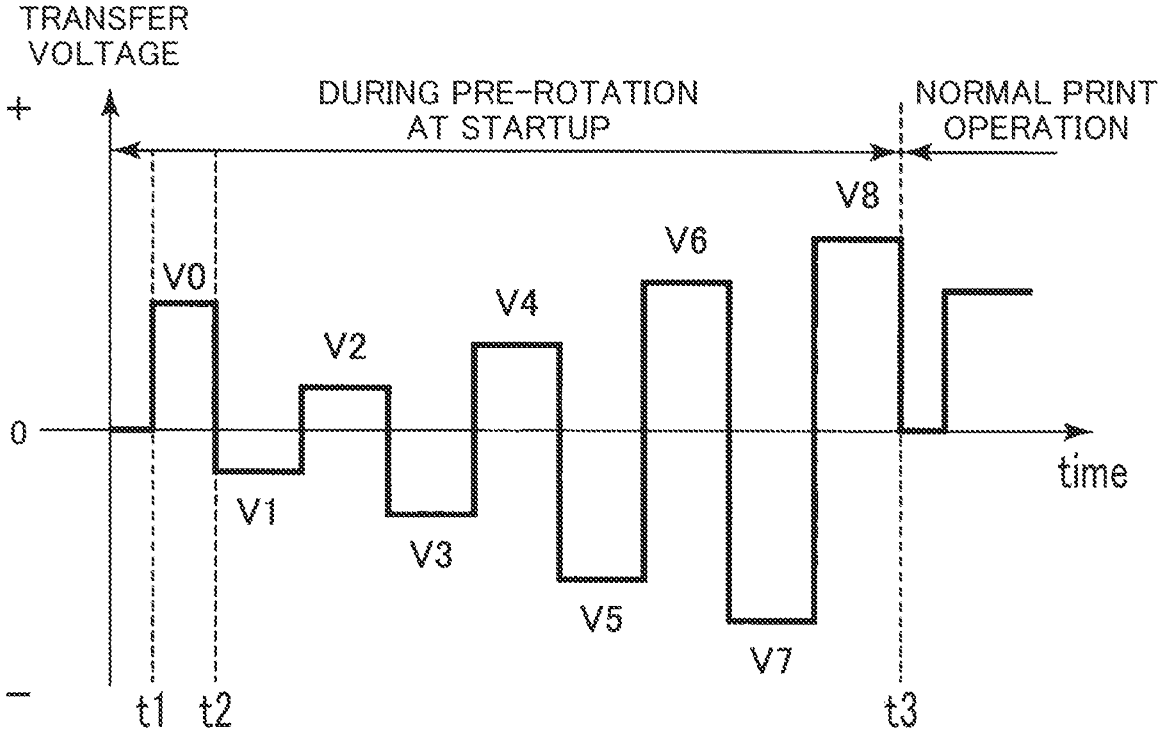

FIG. 3 is a timing chart showing progression of a transfer voltage in transfer voltage control at startup of the image forming apparatus of an embodiment 1 (V0=+1000 V).

Figure 4:
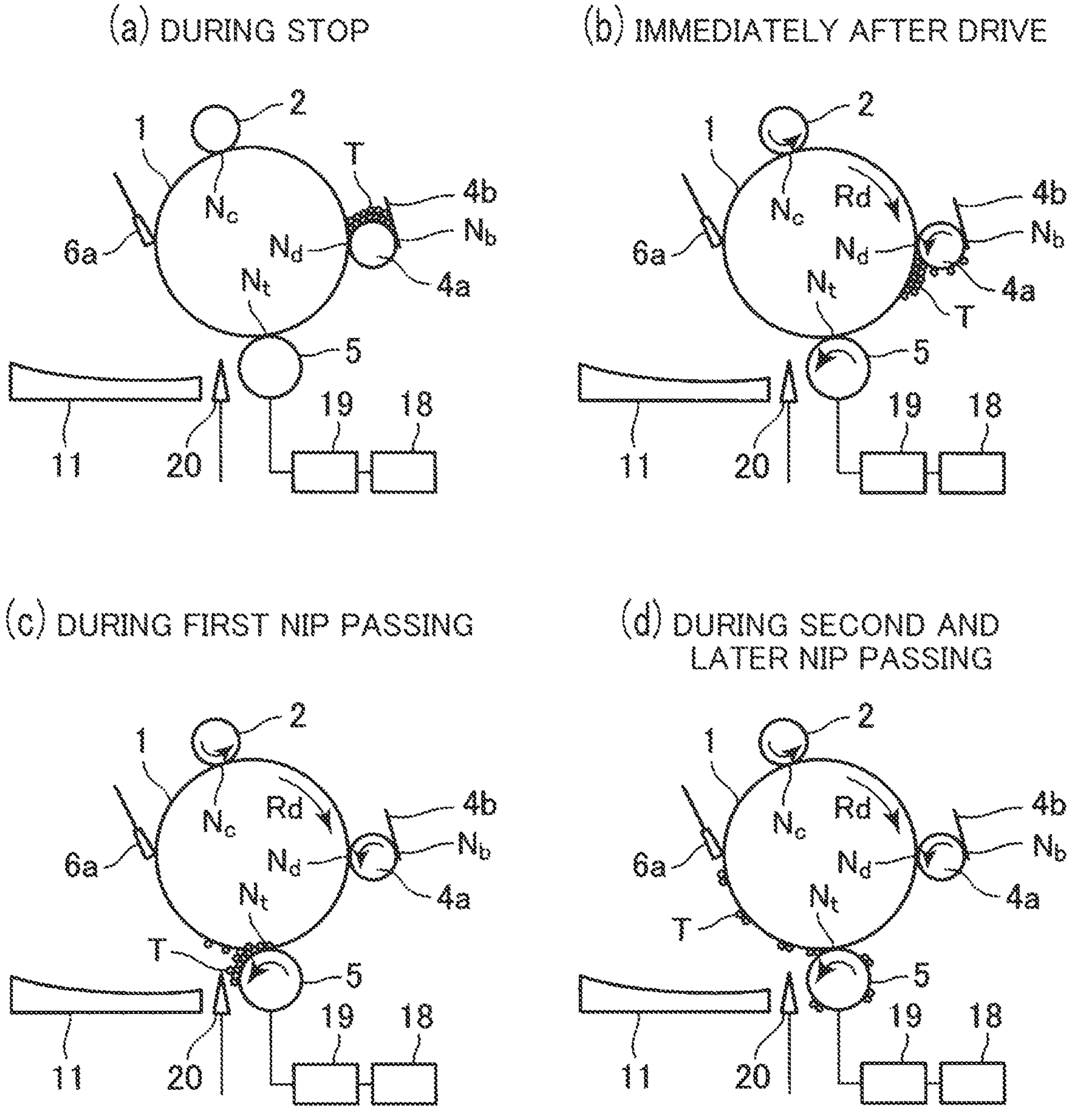

Parts (a) to (d) of FIG. 4 are schematic views for illustrating a mechanism for suppressing the toner scattering due to the fog at startup.

Figure 5:
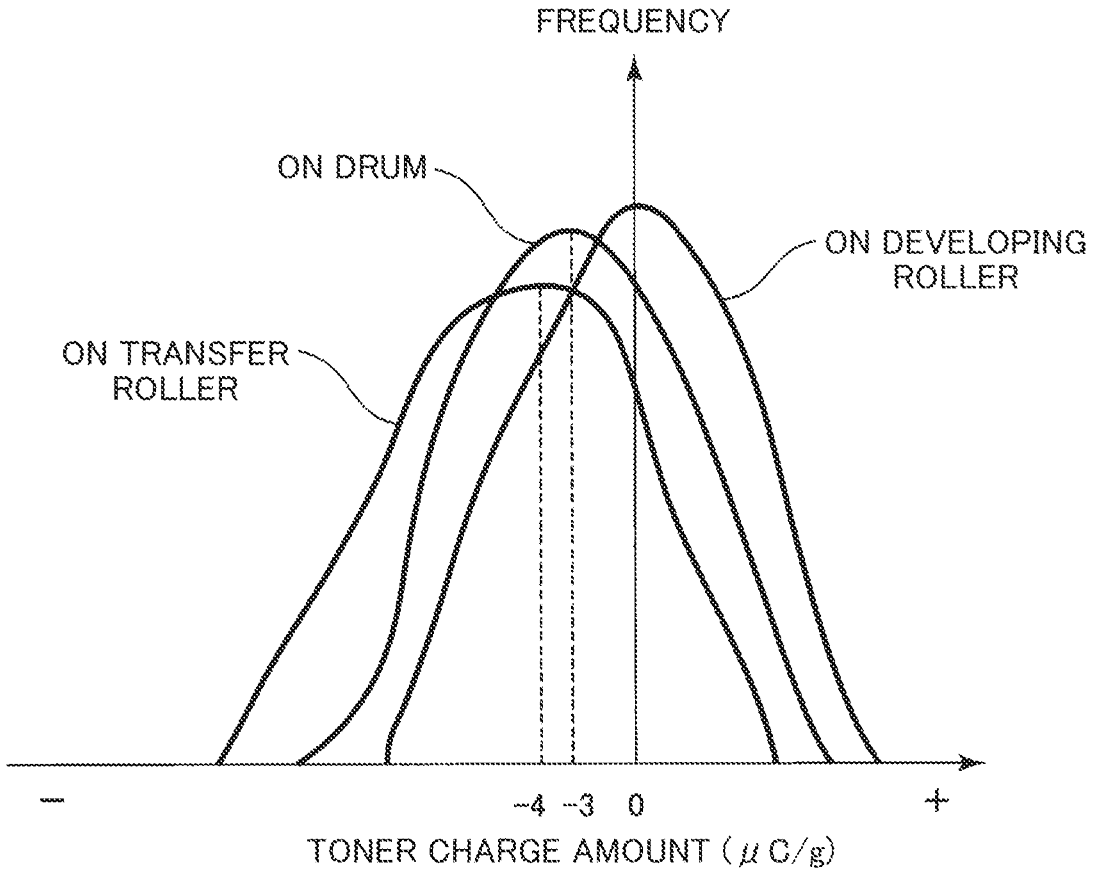

FIG. 5 is a graph showing an electric charge distribution of toner on each of a developing roller, and a transfer roller at startup of the image forming apparatus.

Figure 6:
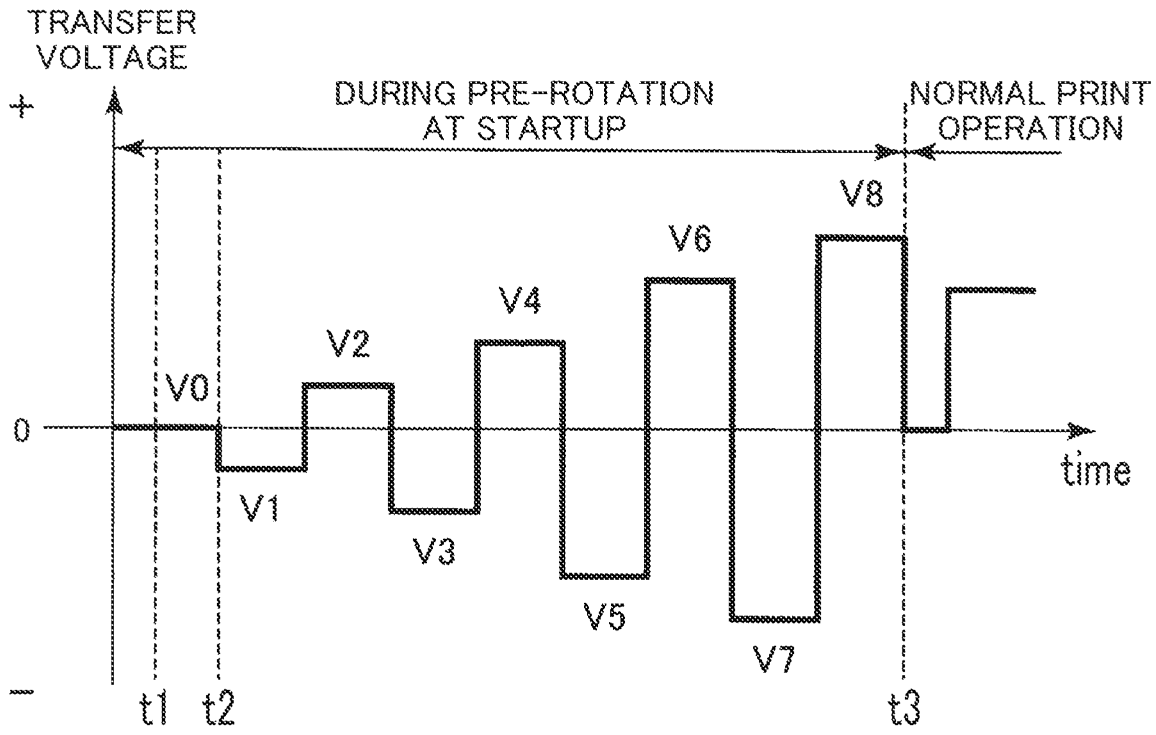

FIG. 6 is a timing chart showing a progression of a transfer voltage in transfer voltage control at startup of the image forming apparatus of the embodiment 1 (V0=0 V).

Figure 7:
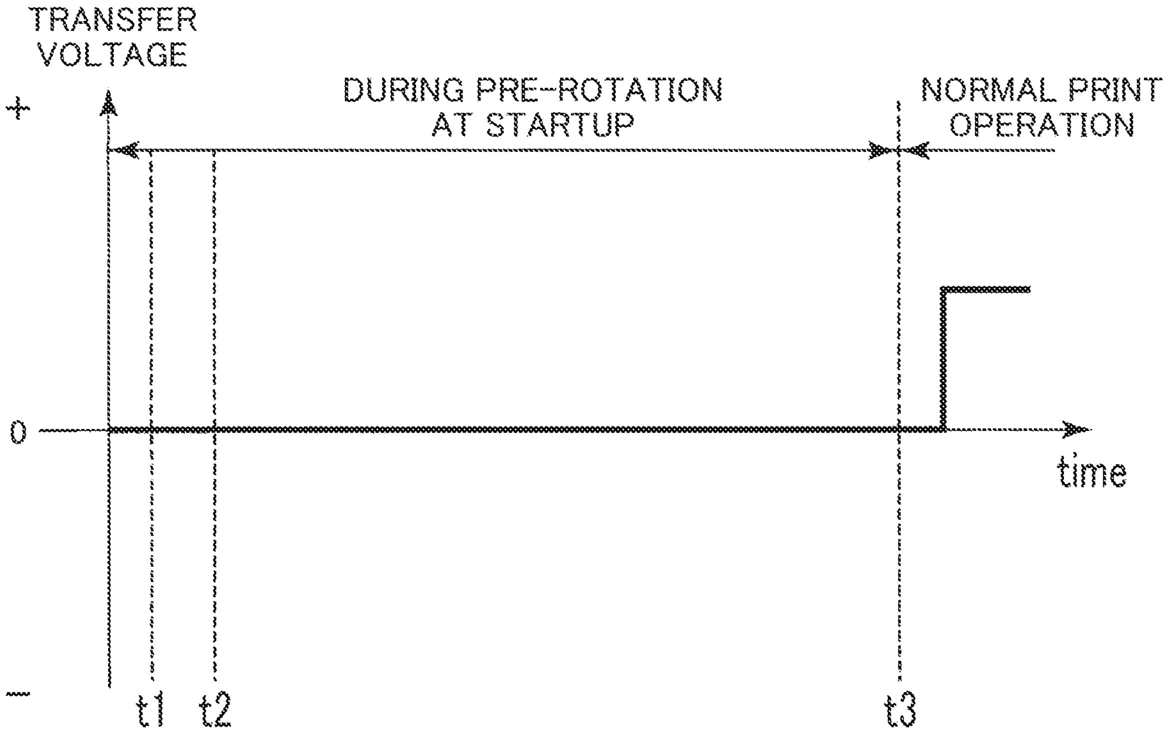

FIG. 7 is a timing chart showing a progression of a transfer voltage in transfer voltage control at startup of an image forming apparatus of a comparison example 1.

Figure 8:
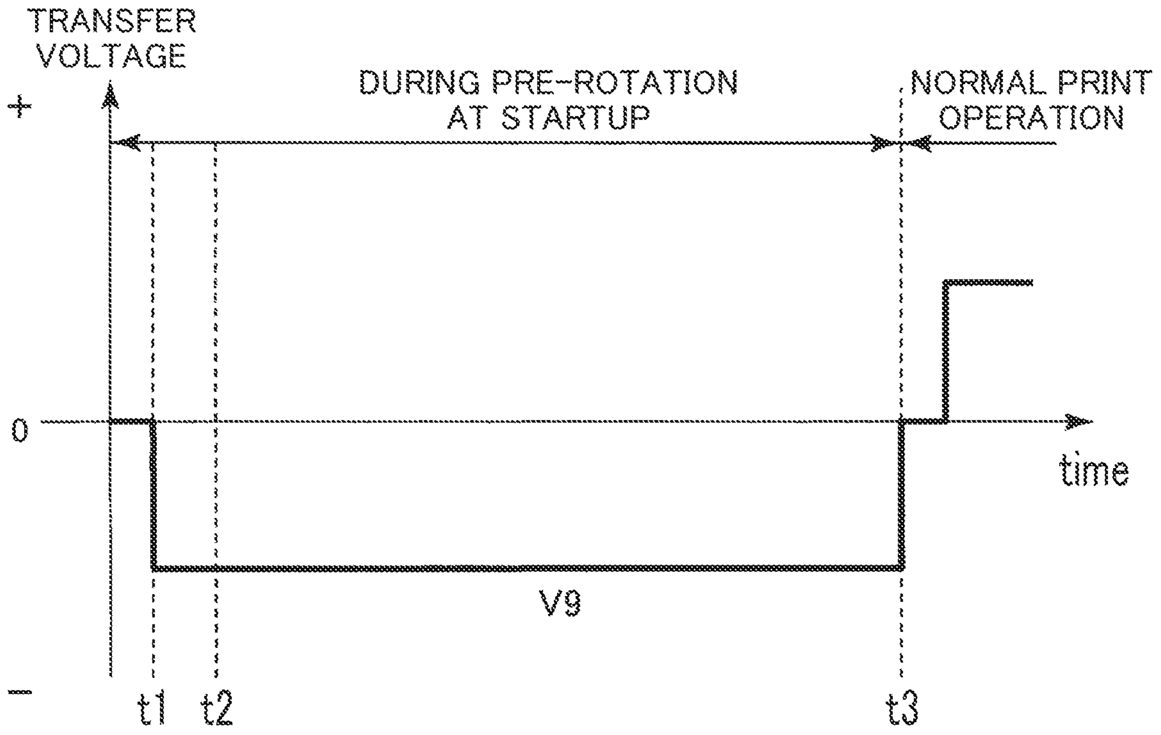

FIG. 8 is a timing chart showing progression of a transfer voltage in transfer voltage control at startup of an image forming apparatus of a comparison example 2.

Figure 9:
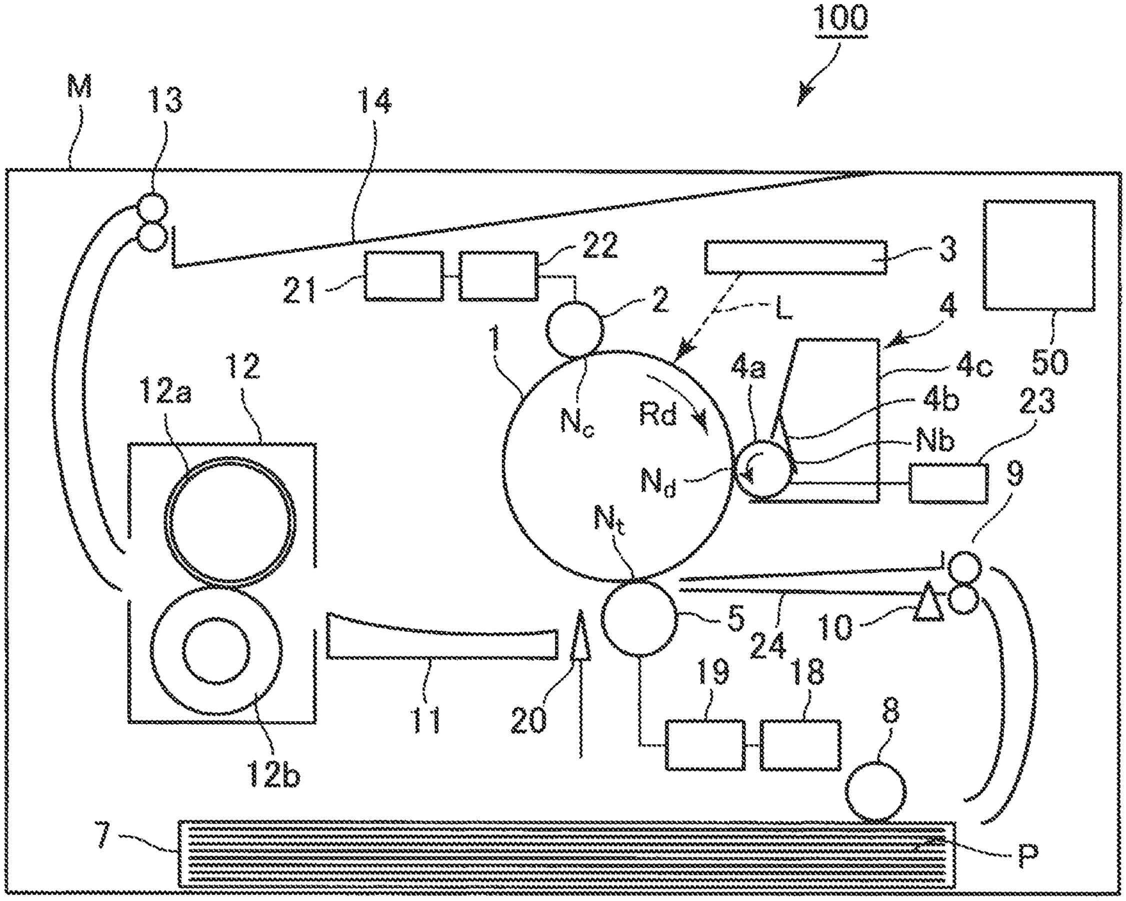

FIG. 9 is a schematic sectional view of the image forming apparatus of the embodiment 1 in another form (cleaner-less constitution).

Figure 10:
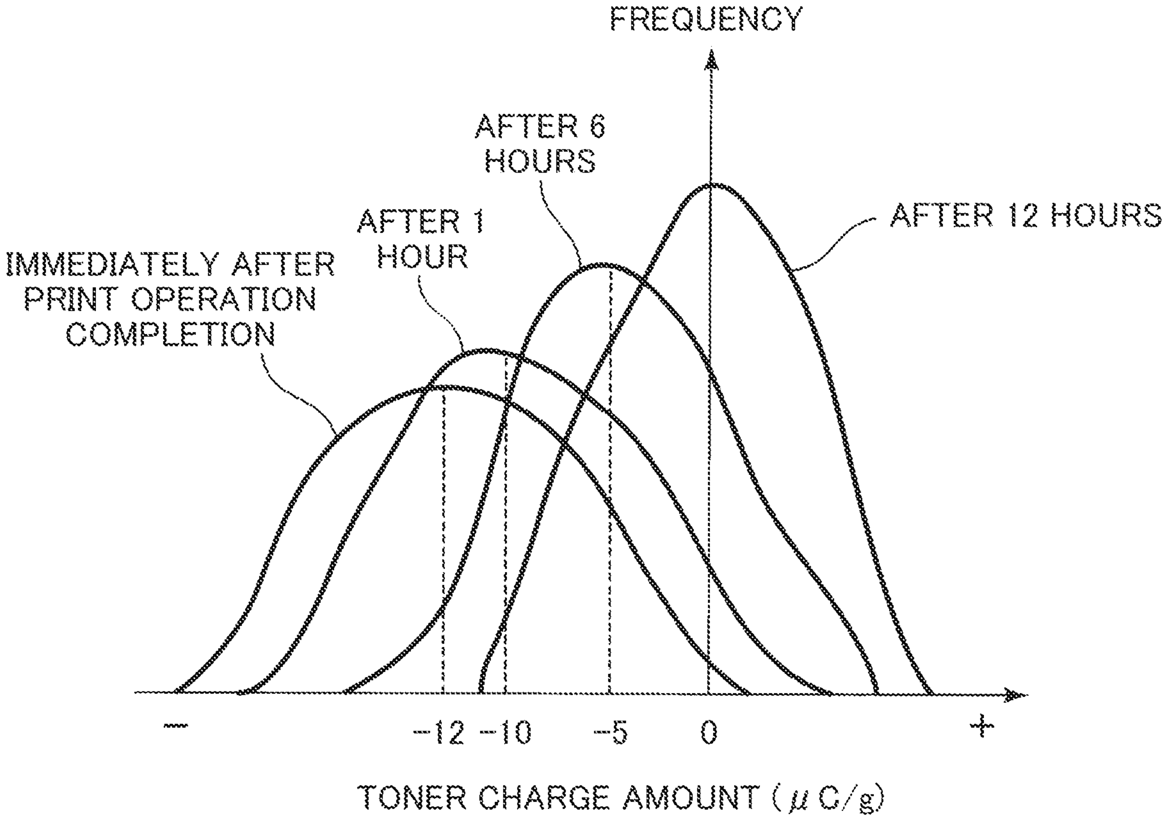

FIG. 10 is a graph showing an electric charge distribution of toner on a developing roller at startup of the image forming apparatus for each of elapsed times from an end of a last print operation.

Figure 11:
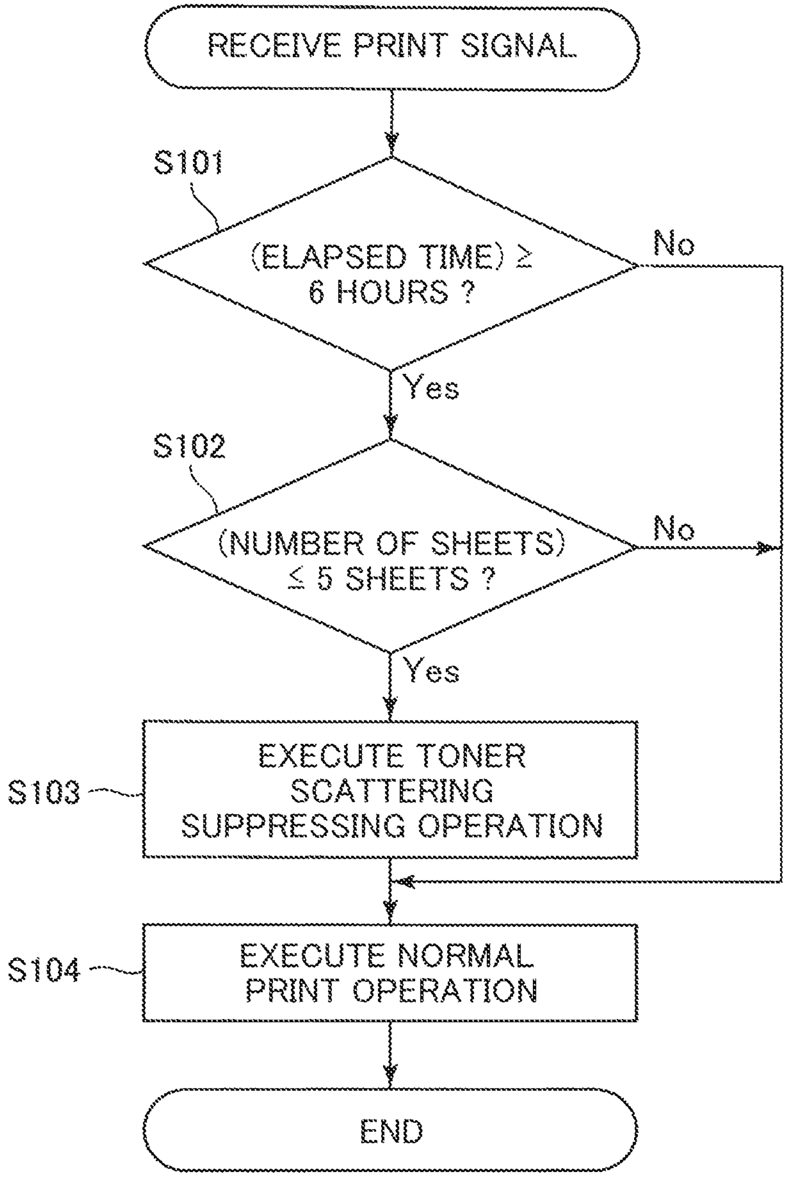

FIG. 11 is a flowchart of control in an embodiment 2.

Figure 12:
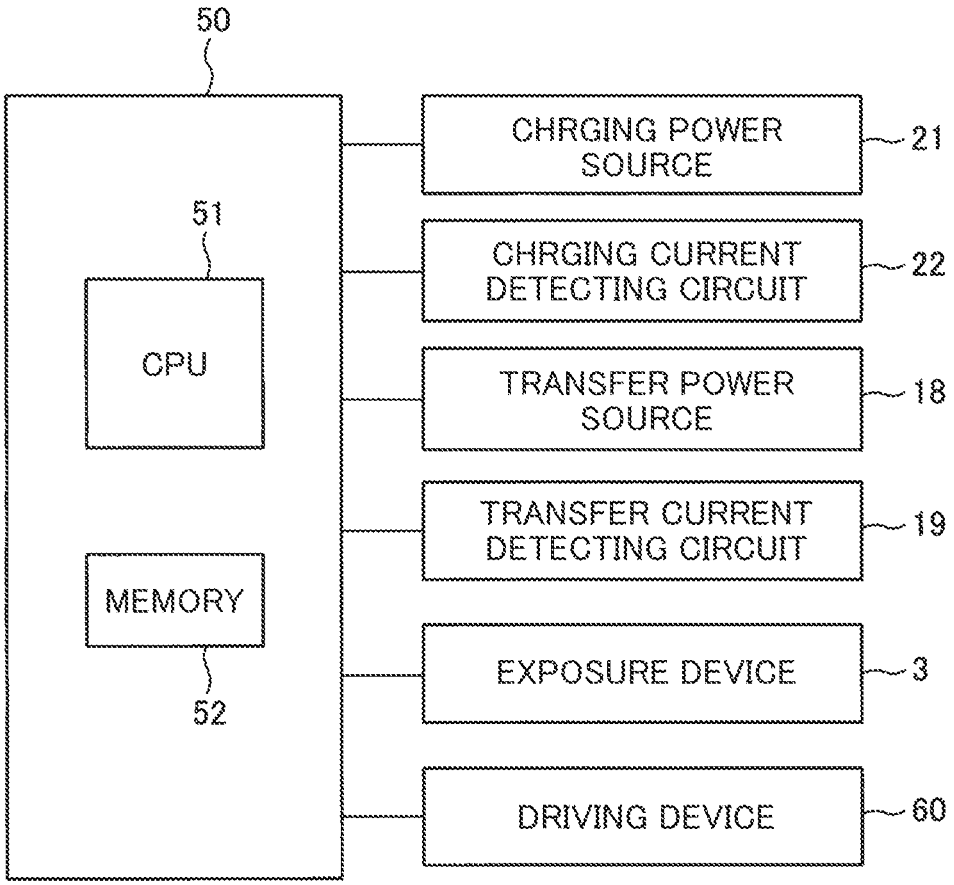

FIG. 12 is a schematic block diagram showing a control constitution of the image forming apparatus.

DESCRIPTION OF THE EMBODIMENTS

In the following, an image forming apparatus according to the present invention will be described specifically with reference to the drawings.

(1) Image Forming Apparatus

Figure 1:
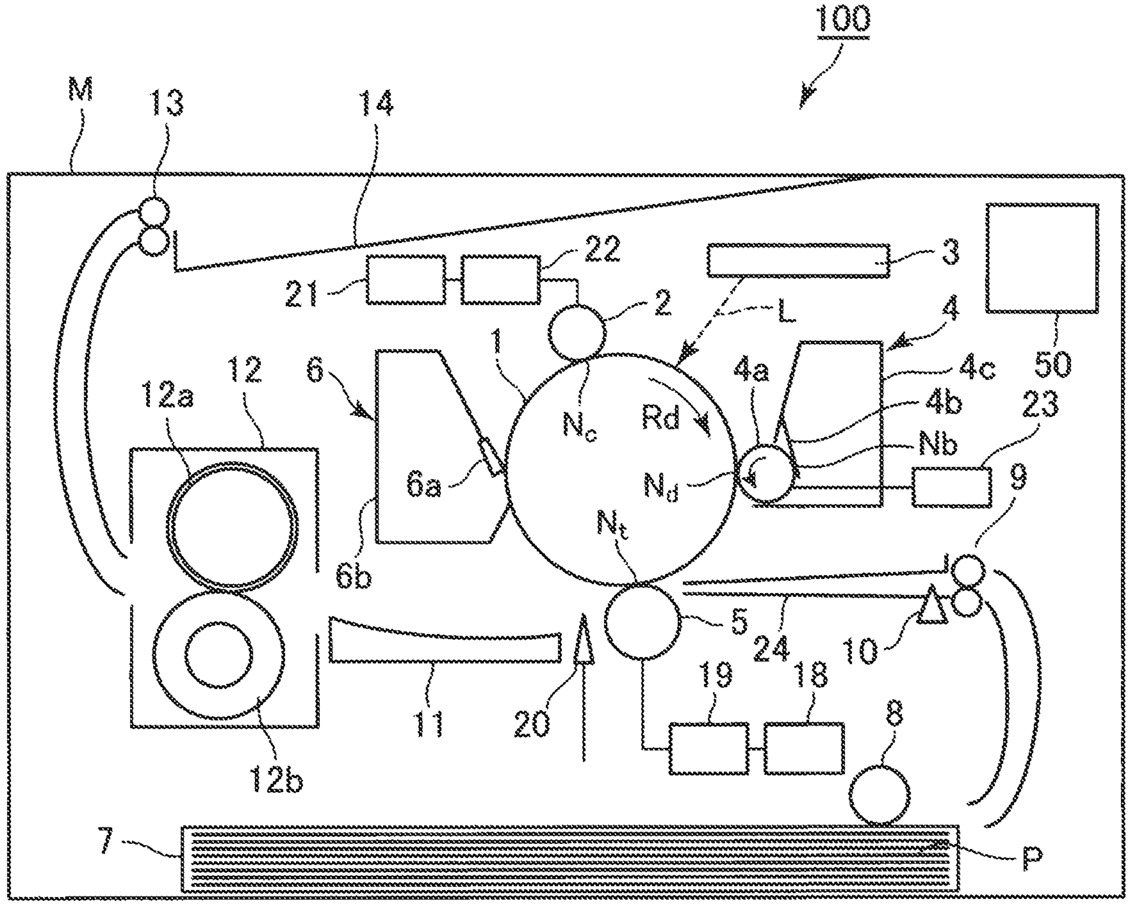
FIG. 1 is a schematic sectional view of an image forming apparatus.

FIG. 1 is a schematic sectional view of an image forming apparatus 100 of this embodiment. The image forming apparatus 100 of this embodiment is a laser beam printer of an electrophotographic type. The image forming apparatus forms an image (black monochromatic image) on a recording material P depending on image information inputted from an external device (not shown) such as a host computer.

The image forming apparatus 1 includes a photosensitive drum 1 which is rotatable drum-shaped (cylindrical) electrophotographic photosensitive member as an image bearing member inside an apparatus main assembly M. The photosensitive drum 1 is prepared by providing a photosensitive material, such as OPC (organic photosemiconductor), amorphous selenium, or amorphous silicon on a cylindrical drum substrate formed of aluminum, nickel, or the like. In this embodiment, the photosensitive drum 1 is a negatively chargeable OPC photosensitive member of φ24 mm in outer diameter, and includes, on a surface of an electroconductive substrate constituted by an aluminum cylinder, a photosensitive layer obtained by laminating a charge-generating layer and a charge-transporting layer in a named order on the electroconductive substrate. The photosensitive drum 1 is rotationally driven in an arrow Rd direction (clockwise direction) in FIG. 1.

Around the photosensitive drum 1, the following means are provided in a named order. First, a charging roller 2 which is a roller-shaped charging member as a charging means is provided. Further, an exposure device 3 as an exposure means is provided. Further, a developing device 4 as a developing means is provided. Further, a transfer roller 5 which is a roller-shaped transfer member as a transfer means is provided. Further, a discharging needle 20 which is a discharging member as a discharging means is provided. Further, a cleaning device 6 as a cleaning means is provided. Along the rotational direction Rd of the photosensitive drum 1, a charging portion (charging position) by the charging roller 2, an exposure portion (exposure position) by the exposure device 3, a developing portion (developing position) by the developing device 4, a transfer portion (transfer position) by the transfer roller 5, and a cleaning portion (cleaning position) by the cleaning device 6 are provided successively in a named order.

The charging roller 2 is constituted by, for example, an electroconductive base shaft (core metal) also functioning as an energization electrode, and an elastic layer cylindrically surrounding an outer peripheral surface of the core metal. In this embodiment, the charging roller 2 is an elastic (member) roller of 910 mm in roller outer diameter, 95 mm in core metal diameter, and 2.5 mm in thickness of the elastic layer. In this embodiment, SUS is used in the core metal of the charging roller 2, and a mixture rubber material of NBR and epichlorohydrin rubber is used in the elastic layer of the charging roller 2. The charging roller 2 is disposed in contact with the photosensitive drum 1. The charging roller 2 electrically charges a surface (outer peripheral surface) of the photosensitive drum 1.

With respect to a rotational direction of the photosensitive drum 1, a position where the photosensitive drum surface is charged by the charging roller 2 is the charging portion (charging position). The charging roller 2 charges the surface of the photosensitive drum 1 by electric discharge generating in at least one of minute gaps, between the photosensitive drum 1 and the charging roller 2, formed on sides upstream and downstream of a contact portion between the photosensitive drum 1 and the charging roller 2 with respect to the rotational direction of the photosensitive drum 1. However, in this embodiment, description will be made by regarding the contact portion between the photosensitive drum 1 and the charging roller 2 as the charging portion (charging position) Ne.

In this embodiment, the exposure device 3 is constituted by a laser scanner device (laser optical system). The exposure device 3 forms an electrostatic latent image (electrostatic image) by exposing the surface of the photosensitive drum 1 to light. With respect to the rotational direction of the photosensitive drum 1, a position where the surface of the photosensitive drum 1 is exposed to light by the exposure device 3 is the exposure portion (exposure position).

The developing device 4 includes a developing container 4*c* for accommodating toner as a developer, a developing roller 4*a* as a developing member (developer carrying member) for feeding the toner to an opposing portion of the photosensitive drum 1, and a developing blade 4*b* as a regulating member. The developing roller 4*a* is rotationally driven in an arrow direction (counterclockwise direction) in FIG. 1, i.e., a direction in which a movement direction of the developing roller 4*a* and a movement direction of the photosensitive drum 1 are formed at the opposing portion of the photosensitive drum 1. The developing blade 4*b* contacts the developing roller 4*a* on a side opposite from the side where the developing roller 4*a* opposes the photosensitive drum 1. The developing blade 4*b* regulates an amount of the toner carried on the developing roller 4*a*, and in addition, imparts an electric charge to the toner on the developing roller 4*a*. The developing blade 4*b* is a plate-like member having a predetermined length in each of a longitudinal direction extending along a rotational axis direction of the developing roller 4*a* and a widthwise (short) direction substantially perpendicular to the longitudinal direction. The developing blade 4*b* is provided so that a leading end thereof on a free end portion side with respect to the widthwise direction is directed toward an upstream side of the rotational direction of the developing roller 4*a* and so that a neighborhood of the leading end contacts the outer peripheral surface of the developing roller 4*a* in a surface contact state. Incidentally, in this embodiment, the image forming apparatus 100 does not include a contact and separation mechanism for switching contact and separation of the developing roller 4*a* relative to the photosensitive drum 1. That is, in this embodiment, the developing roller 4*a* and the photosensitive drum 1 are driven always in a contact state. Thus, since the image forming apparatus 100 is not provided with the contact and separation mechanism, downsizing of the apparatus main assembly M is realized. In this embodiment, to the photosensitive drum 1 and the developing roller 4*a*, for example, a driving force is transmitted from a common driving source of a driving device 60 (FIG. 12), so that the photosensitive drum 1 and the developing roller 4*a* are rotated in synchronism with each other, and rotation thereof is stopped in synchronism with each other. With respect to the rotational direction of the photosensitive drum 1, a position where the toner is supplied by the developing roller 4*a* of the developing device 4 is the developing portion (developing position). In this embodiment, the contact portion between the developing roller 4*a* and the photosensitive drum 1 is the developing portion (developing nip) Nd. Further, a contact portion between the developing roller 4 and the developing blade 4*b* with respect to the rotational direction of the developing roller 4*a* is a blade nip (regulating portion) Nb.

The transfer roller 5 is disposed opposed to the photosensitive drum 1. The transfer roller 8 is urged (pressed) toward the photosensitive drum 1 by a transfer pressing spring (not shown) which is an urging member as an urging means, and is press-contacted to the photosensitive drum 1. By this, a transfer nip (transfer portion, transfer nipping portion) Nt which is a contact portion between the photosensitive drum 1 and the transfer roller 5 is formed. The transfer roller 5 is rotated with rotation of the photosensitive drum 1. Incidentally, in this embodiment, the image forming apparatus 100 does not include the contact and separation mechanism for switching contact and separation of the developing roller relative to the photosensitive drum 1. The transfer roller 5 not only nips and feeds the recording material P between itself and the photosensitive drum 1, but also transfers the toner image from the photosensitive drum 1 onto the recording material P, passing through the transfer nip Nt, under application of a voltage. The transfer roller 5 is constituted, for example, by an electroconductive base shaft (core metal) also functioning as an energization electrode, and an elastic layer cylindrically surrounding an outer peripheral surface thereof. As a material of the elastic layer of the transfer roller 5, in general, a semiconductor rubber material constituted by using EPDM, NBR, urethane rubber, epichlorohydrin rubber, silicone rubber, or the like is used. In this embodiment, the transfer roller 5 is an elastic roller of 14 mm in roller outer diameter, φ5 mm in core metal diameter, and 4.5 mm in thickness of the elastic layer. In this embodiment, SUS is used in the core metal of the transfer roller 5, and a mixture rubber material of NBR and epichlorohydrin rubber is used in the elastic layer of the transfer roller 5. Further, in this embodiment, a contact pressure of the transfer roller 5 to the photosensitive drum 1 is 9.8 N (1 kgf). Further, in this embodiment, an electric resistance value of the transfer roller 5 is $4.0\times10^{7}\Omega$ in a state in which the transfer roller 5 is pressed against an aluminum cylinder by a force of 9.8 N and is rotated at a speed of 50 mm/sec under application of a voltage of +1000 V. With respect to the rotational direction of the photosensitive drum 1, a position where the toner is transferred by the transfer roller 5 (position corresponding to the above-described transfer nip Nt) is a transfer position.

The discharge (charge-removing) needle 20 discharges (removes) excessive electric charges on the surface of the recording material P after the transfer. In this embodiment, as the discharging needle 20, a discharging needle which is provided with a saw-tooth-like sharp end portion and which is formed with a thin metal plate material, such as SUS plate or aluminum plate, having good electroconductivity is used. This discharging needle 20 is disposed on a side downstream of the transfer roller 5 with respect to the feeding direction of the recording material P so that a needle tip opposes the surface of the photosensitive drum 1. That is, the discharging needle 20 is disposed so that the needle tip opposes a feeding passage of the recording material P (i.e., opposes the recording material P fed along the feeding passage). In this embodiment, the discharging needle 20 is electrically grounded via a resistance element (not shown). Incidentally, a constitution in which a voltage (for example, a voltage of the same polarity as the normal charge polarity of the toner) is applied to the discharging needle 20 may also be employed.

The cleaning device 6 cleans the surface of the photosensitive drum 1 by removing toner remaining on the photosensitive drum 1. In this embodiment, the cleaning device 6 includes a cleaning blade 6*a* as a cleaning member, and a cleaning container 6*b* for accommodating collected toner. With respect to the rotational direction, a position where the toner is removed by the cleaning device 6 (contact position between the cleaning blade 6*a* and the photosensitive drum 1) is the cleaning portion (cleaning position).

Further, at a lower portion of the apparatus main assembly in FIG. 1, a recording material cassette 7 in which the recording material (transfer material, recording medium, form, sheet) P such as paper is accommodated is provided. Further, along a feeding passage of the recording material P from the recording material cassette 7, a feeding roller 8, a conveying roller 9, a top sensor 10, a pre-transfer guide 24, a transfer-fixing conveying guide 11, a fixing device 2, a discharging roller 13 and a discharge tray 14 are disposed in a named order.

Further, as shown in FIG. 12, the apparatus main assembly M is provided with a controller 50 as a control means managing control of an entire operation of the image forming apparatus 100. The controller 50 is constituted by including a CPU 51 as a calculation control means, a memory 52 such as ROM, RAM or a nonvolatile memory as a storing means, an input/output portion (not shown) for controlling transfer of information (signals) between the controller 50 and an external device, and the like. The CPU 51 executes predetermined calculation processing. In the ROM of the memory 52, a predetermined control program is stored. In the RAM of the memory 52, data is temporarily stored. In the nonvolatile memory of the memory 52, use history or the like of each of the respective portions is stored. In the controller 50, for example, a charging power source 21, a charging current detecting circuit 22, a transfer power source 18, a transfer current detecting circuit 19, and the exposure device 3 are connected. Further, to the controller 50, for example, the driving device 60 as a driving means for driving the photosensitive drum 1, the developing roller 4*a*, a feeding roller 8, a conveying roller 9, and the like is connected. Further, in accordance with the control program stored in the ROM, the controller 50 controls the respective portions of the image forming apparatus 100.

Incidentally, the photosensitive drum 1 and, as process means, the charging roller 2, the developing device 4, and the cleaning device 6 may be integrally assembled into a cartridge which is detachably mountable to the apparatus main assembly M of the image forming apparatus 100.

Next, an image forming operation of the image forming apparatus 100 of this embodiment will be described. The photosensitive drum 1 is rotationally driven in an arrow Rd direction (clockwise direction) in FIG. 1 at a peripheral speed (process speed) of 320 mm/sec by a driving source of the driving device 60. The surface of the rotating photosensitive drum 1 is electrically charged by the charging roller 2 uniformly to a desired potential (dark-portion potential) of the same polarity as a normal charge polarity (negative in this embodiment) of the toner. During the charging, to the charging roller 2, a charging voltage (charging bias) which is a DC voltage of the same polarity (negative polarity in this embodiment) as the normal charge polarity of the toner is applied from a charging power source (high-voltage power source) 21 as a charging voltage applying means through a charging current detecting circuit 22. In this embodiment, as a charging voltage, a voltage of −100 V is applied to the charging roller 2, so that a dark-portion potential of the photosensitive drum 1 becomes −500 V. The charged surface of the photosensitive drum 1 is subjected to image exposure L based on image information by the exposure device 3, and electric charges at a portion exposed to the light are removed, so that a light-portion potential (−100 V in this embodiment) is formed on the surface of the photosensitive drum 1. By this, the electrostatic latent image (electrostatic image) is formed on the photosensitive drum 1 by a contrast between the dark-portion potential and the above-described light-portion potential.

The electrostatic latent image formed on the photosensitive drum 1 is developed (visualized) by being supplied with the toner by the developing device 4, so that the toner image is formed on the photosensitive drum 1. To the toner on the developing roller 4*a*, a negative electric charge is imparted by rubbing the toner with the developing blade 4*b*. During the development, to the developing roller 4*a*, a developing voltage (developing bias) which is a DC voltage of the same polarity (negative polarity in this embodiment) as the normal charge polarity of the toner is applied from a developing power source (high-voltage power source) 23 as a developing voltage applying means. In this embodiment, as the developing voltage, a voltage of −350 V is applied to the developing roller 4*a*. The toner to which the electric charge is imparted is deposited on an image portion of the electrostatic latent image and thus forms a toner image. Thus, in this embodiment, on an exposure portion (image portion) of the photosensitive drum 1 where an absolute value of the surface potential lowered by the exposure after the photosensitive drum surface is charged uniformly, toner charged to the same polarity (negative polarity in this embodiment) as the charge polarity of the photosensitive drum 1 is deposited (reverse development type). In this embodiment, the normal charge polarity of the toner, which is a principal charge polarity of the toner during the development, is the negative polarity.

The toner image formed on the photosensitive drum 1 is transferred onto the recording material P such as paper in the transfer nip Nt by the action of the transfer roller 5. During the transfer, to the transfer roller 5, a transfer voltage (transfer bias) which is a DC voltage of an opposite polarity (positive in this embodiment) to the normal charge polarity of the toner is applied from a transfer power source (high-voltage power source) 18 as a transfer voltage applying means through a transfer current detecting circuit 19. By this, the toner image on the photosensitive drum 1 is electrostatically transferred to a predetermined position of the recording material P. The recording material P is accommodated in the recording material cassette 7 and is fed one by one by the feeding roller 8. This recording material P is conveyed by the conveying roller (registration roller) 9 by being timed to the toner image on the photosensitive drum 1, and is supplied to the transfer nip Nt along the pre-transfer guide 24 as a guiding member.

From the recording material P on which the toner image is transferred in the transfer nip Nt, surface electric charges in an excessive charge amount are removed by the discharging needle 20. The recording material P passed through the charge removing needle 20 is conveyed toward the fixing device 12 as a fixing means along the transfer-fixing conveying guide 11 (hereinafter, simply referred to as a "conveying guide") as a guiding member. The fixing device 12 includes a fixing roller 12*a* and a pressing roller 12*b* press-contacting the fixing roller 12*a*. The fixing device 12 heat applies and pressure to the recording material P passing through a fixing portion (fixing nip) formed by the fixing roller 12*a* and the pressing roller 12*b*, so that the unfixed toner image is fixed (method, stuck) on the recording material P. The recording material P on which the toner image is fixed by the fixing device 12 is discharged (outputted) by the discharging roller 13 on the discharge tray 14 formed at an upper surface of the apparatus main assembly M in FIG. 1.

On the other hand, toner (transfer residual toner) remaining on the surface of the photosensitive drum 1 without being transferred is removed from the surface of the photosensitive drum 1 by the cleaning blade 6*a* of the cleaning device 6, and is collected in the cleaning container 6*b*.

By repeating the above-described operation, image formation can be successively carried out. The image forming apparatus 100 of this embodiment is capable of executing printing at a print speed of 60 sheets per min.

Incidentally, the image forming apparatus 100 executes a print(ing) operation (print(ing) job) which is a series of operations for forming and outputting the image (images) on a single or a plurality of recording materials P and which is started by a single starting instruction. The print operation includes in general an image forming step (image forming operation), a pre-rotation step, a sheet interval step in the case where the images are formed on the plurality of recording materials P, and a post-rotation step. The image forming step is a period in which, formation of the electrostatic latent image for the image formed and outputted on the recording material P, formation of the toner image, and transfer of the toner image, and the like are carried out in actuality, and during image formation (during the image forming operation) refers to this period. Specifically, a timing during image formation is different at each of the positions where the respective steps of the formation of the electrostatic latent image, the formation of the toner image, the transfer of the toner image, and the like are carried out, and corresponds to a period in which an image forming region on the photosensitive drum 1 passes through an associated one of the above-described respective positions. The pre-rotation step is period from the input of the start instruction until the image is started to be formed in actuality, in which a preparation operation before the image forming step is performed. The sheet interval step (image interval step, recording material interval step) is a period corresponding to an interval between two recording materials P when the images are continuously formed on the plurality of recording material P (continuous image formation, continuous print). The post-rotation step is period in which a post operation (preparatory operation) after the image forming step is performed. During non-image formation is a period other than during the image formation and includes the periods of the pre-rotation step, the sheet interval step, the post-rotation step, and in addition, during turning-on of a power source of the image forming apparatus 100, a pre-multi-rotation step which is a preparatory operation step during restoration from a sleep state, or the like. Specifically, a timing during the non-image formation corresponds to a period in which a non-image forming region on the photosensitive drum 1 passes through the associated one of the respective positions where the steps of forming the electrostatic latent image, forming the toner image, and transferring the toner image. Here, the image forming region on the photosensitive drum 1 refers to a region which is defined in advance depending on a size of the recording material P and on which the toner image transferred onto the recording material P and then outputted from the image forming apparatus 100 is capable of being outputted, and the non-image forming region refers to a region other than the image forming region.

(2) Occurrence Mechanism of Toner Scattering Due to Fog at Startup

Next, an occurrence mechanism of toner scattering to a fog at startup will be described. Parts (a) to (d) of FIG. 2 are schematic views of a periphery of the photosensitive drum 1 for illustrating the occurrence mechanism of the toner scattering due to the fog at startup. These figures show the case where an image forming apparatus which is substantially the same in basic constitution as the image forming apparatus 100 of this embodiment is used and conventional transfer voltage control is used as transfer voltage control is used as transfer voltage control at startup of the image forming apparatus.

Part (a) of FIG. 2 shows a state in which a long time has elapsed in a state in which the image forming apparatus is at rest from an end of a last print operation. In this embodiment, the "lapse of long time" is assumed to be 12 hours or more at which an average electric charge of the toner T on the developing roller 4*a* is close to 0 μC/g (zero triboelectric toner). Further, after such a lapse of long time, the surface potential of the photosensitive drum 1 is attenuated so as to be close to 0 V.

When a drive instruction such as a print signal is provided to the image forming apparatus 100, before shifting to the image forming operation, in order to remove the residual toner on the photosensitive drum 1 by the cleaning device 6, the photosensitive drum 1 is rotationally driven in a state in which there is no recording material P in the transfer nip Nt (pre-rotation operation). Substantially at the same time as a start of the rotational drive of the photosensitive drum 1, application of the charging voltage to the cleaning roller 2 similar to that during the normal image forming operation and application of the developing voltage to the developing roller 4*a* similar to that during the normal image forming operation are started. The developing voltage at this time does not need to be the developing voltage similar to the developing voltage during the normal image forming operation. For example, the developing voltage may be a developing voltage which has the same polarity as the developing voltage during the normal image forming operation and which is smaller in absolute value than the developing voltage during the normal image forming operation, and not the voltage of the negative polarity which is the normal charge polarity of the toner, a voltage of an opposite polarity to the normal charge polarity of the toner may be applied.

Part (b) of FIG. 2 shows a state immediately after the drive of the photosensitive drum 1. As shown in part (b) of FIG. 2, the toner T deposited on the developing roller 4*a* during a stop of the drive is transferred as the fog at startup onto the photosensitive drum 1. There are two principal reasons thereof.

A first reason is that there is a section (section from the blade nip Nb to the developing portion Nd with respect to the rotational direction of the developing roller 4*a*) which is a section in which the toner T on the developing roller 4*a* is carried and in which the toner T passes through the developing portion Nd without passing through the blade nip Nb at startup of the image forming apparatus 100. The toner T in the section enters the developing portion Nd while being the "zero triboelectric toner". For that reason, irrespective of a potential difference between the photosensitive drum 1 and the developing roller 4*a* in the developing portion Nd, by a force relationship of non-electrostatic depositing force between the toner T and each of the members (the photosensitive drum 1, the developing roller 4*a*), the toner T is transferred from the developing roller 4*a* onto the photosensitive drum 1.

A second reason is that there is a section (section from the charging portion Nc to the developing portion Nd with respect to the rotational direction of the photosensitive drum 1) which is a section on the photosensitive drum 1 and in which the toner T passes through the developing portion Nd while the surface potential is kept attenuated at startup of the image forming apparatus 100. The surface of the photosensitive drum 1 in the section cannot generate a sufficient potential difference between itself and the developing roller 4*a* in the developing portion Nd. For that reason, irrespective of the electric charge of the toner, by the force relationship of non-electrostatic depositing force between the toner T and each of the members (the photosensitive drum 1, the developing roller 4*a*), the toner T is transferred from the developing roller 4*a* onto the photosensitive drum 1.

For the above-described two reasons, in a condition in which the fog at startup occurs, for example, in a relatively poor condition, fog toner T close to a solid image where the toner T is superposed in a single layer or more is transferred from the developing roller 4*a* onto the photosensitive drum 1. As described above, with respect to the rotational direction of the developing roller 4*a*, the toner T positioned in a section from a region on the developing roller 4*a* positioned in the blade nip Nb during the stop of the drive to a region on the developing roller 4*a* positioned in the developing portion Nd during the stop of the drive. Further, as described above, with respect to the rotational direction of the photosensitive drum 1, in a section from a region on the photosensitive drum 1 positioned in the charging portion Nc during the stop of the drive to a region on the photosensitive drum 1 positioned in the developing portion Nd during the stop of the drive, at startup of the image forming apparatus 100, even the toner passed through the blade nip Nb is transferred onto the photosensitive drum 1 in some instances.

The toner T transferred from the developing roller 4*a* on the photosensitive drum 1 slides with the transfer roller 5 when first passes through the transfer nip Nt, so that the toner T is scattered toward a downstream side of the transfer nip Nt with respect to the feeding direction of the recording material P (part (c) of FIG. 2). This scattered toner T is deposited on the discharging needle 20 and the feeding guide 11. Usually, during the pre-rotation operation, no transfer voltage is applied (0 V) or a transfer voltage of the same polarity (negative polarity in this embodiment) as the normal charge polarity of the toner T is applied for suppressing the toner deposition onto the transfer roller 5. In the case where the transfer voltage is 0 V, a state in which there is no potential difference between the photosensitive drum 1 and the transfer roller 5 in the transfer nip Nt is formed. For that reason, a retaining force of the toner T onto the photosensitive drum 1 and a retaining force of the toner T onto the transfer roller 5 become weak, so that toner scattering from the transfer nip Nt occurs due to inertia by the rotational drive of the photosensitive drum 1. On the other hand, in the case where the transfer voltage of the negative polarity is applied, the zero triboelectric toner is slightly charged to the negative polarity by the slide (friction) in the developing portion Nd, and therefore, the slightly negatively charged toner T is liable to remain on the photosensitive drum 1 by being repelled by the transfer roller 5 to which the transfer voltage of the negative polarity is applied. For that reason, due to the repulsion and the inertia by the rotational drive of the photosensitive drum 1, the toner scattering from the transfer nip Nt occurs.

A part of the toner T transferred from the photosensitive drum 1 on the transfer roller 5 by a non-electrostatic depositing force between the toner T and the transfer roller 5 is repetitively slid (rubbed) against the transfer nip Nt so that the toner scattering from the transfer nip Nt is repeated (part (d) of FIG. 2).

Further, when the toner scattering as described above is repeated every time when, for example, the fog at startup occurs, the toner t is gradually deposited (accumulated) on the discharging needle 20 and the feeding guide 11. This deposited (accumulated) toner T appears as paper trailing end contamination occurring by deposition of the toner on a trailing end of the recording material P due to slid (friction) of the trailing end of the recording material P with the feeding guide 11 during the print operation or as an improper transfer image due to a lowering in function of the discharging needle 20 in some instances.

As the case where the toner T such as a slid image enters the transfer nip Nt in a state without interposing the recording material, in addition to the fog at startup as described above, there is a time of startup (restoration) of the image forming apparatus 100 after jam clearance of paper jam or the like. However, in this case, in most instances, after the jam clearance, the image forming apparatus 100 is started up (restored) in a relatively short time. For that reason, the electric charges of the toner T on the photosensitive drum 1 are held as they are, and the second potential of the photosensitive drum 1 is in a state in which the surface potential is not attenuated, so that a retaining force of the toner T on the photosensitive drum 1 remains strong. Accordingly, in this case, the toner scattering from the transfer nip Nt does not readily occur.

That is, the toner scattering from the transfer nip Nt is a phenomenon peculiar to the fog at startup such that in the case where the developing roller 4*a* is not separated from the photosensitive drum 1 during the startup of the image forming apparatus 100, the toner T of which electric charges are attenuated is transferred from the developing roller 4*a* to the photosensitive drum 1.

(3) Toner Scattering Suppressing Control in this Embodiment

Next, transfer voltage control at startup of the image forming apparatus 100 for suppressing the toner scattering due to the fog at startup (herein, this control is also referred to as "toner scattering suppressing control) will be described. FIG. 3 is a timing chart showing progression of the transfer voltage in the transfer voltage control at startup of the image forming apparatus 100 in this embodiment. In FIG. 3, the abscissa represents a time, and the ordinate represents the transfer voltage (in FIG. 3, each of t1, t2, and t3 represents a timing (point of time)). Further, parts (a) to (d) of FIG. 4 are schematic views, of a periphery of the photosensitive drum 1, for illustrating a mechanism for suppressing the toner scattering from the transfer nip Nt in the case where the transfer voltage control at startup of the image forming apparatus 100 in this embodiment is carried out. Further, FIG. 5 is a graph showing a measurement result of an electric charge distribution of the toner T on each of the developing roller 4*a* in a state of part (a) of FIG. 4, the photosensitive drum 1 in a state of part (b) of FIG. 4, and the transfer roller 5 in a state of part (c) of FIG. 4, which are described below. The electric charge distribution of the toner T was measured using a measuring device ("E-SPART ANALYZER (model: EST-G)", manufactured by Hosokawa Micron Corp.).

Part (a) of FIG. 4 shows a state of the periphery of the photosensitive drum 1 after a lapse of 12 hours from an end of the last print operation in a rest state. This state of part (a) of FIG. 4 is the same as the state of part (a) of FIG. 2. The measuring result of the electric charge distribution on the developing roller 4*a* in the state of part (a) of FIG. 4 is shown by a plot of "ON DEVELOPING ROLLER", in FIG. 5. Originally, the toner T has the negative electric charge. However, by the influence of electric charge attenuation due to a lapse of a long time, a center value of the electric charge distribution of the toner T becomes 0 μC/g.

Part (b) of FIG. 4 is a state immediately after the rotational drive of the photosensitive drum 1 is started in the pre-rotation operation by providing a drive instruction such as a print signal to the image forming apparatus 100. This state of part (b) of FIG. 4 is the same as the state of part (b) of FIG. 2. In this embodiment, substantially at the same time as a start of the rotational drive of the photosensitive drum 1, application of the charging voltage to the charging roller 2 similar to that during the normal image forming operation and application of the developing voltage to the developing roller 4*a* similar to that during the normal image forming operation are started. As described above, the developing voltage at this time needs not to be the developing voltage similar to the developing voltage during the normal image formation. For example, the developing voltage may be a developing voltage which has the same polarity as the developing voltage during the normal image formation and which has a small absolute value, and not the voltage of the negative polarity which is the normal charge polarity of the toner, a voltage of an opposite polarity to the normal charge polarity may be applied. The toner T transferred from the developing roller 4*a* on the photosensitive drum 1 as described above is slightly charged to the 1*o* negative polarity side by the slide in the developing portion Nd. A measuring result of the electric charge distribution on the photosensitive drum 1 in the state of part (b) of FIG. 4 is shown by a plot of "ON DRUM" in FIG. 5. As shown by the plot of "ON DEVELOPING ROLLER" in FIG. 5, the center value of the electric charge distribution of the toner T on the developing roller 4*a* was 0 μC/g, and on the other hand, as shown by the plot of "ON DRUM" in FIG. 15, the center value of the electric charge distribution of the toner T on the photosensitive drum 1 becomes −3 μC/g.

Part (c) of FIG. 4 shows a state when the fog toner T transferred from the developing roller 4*a* to the photosensitive drum 1 first passes through the transfer nip Nt. At this time, as shown in FIG. 3, in a period from t1 to t2, a transfer voltage V0 of the opposite polarity (positive polarity in this embodiment) to the normal charge polarity of the toner T is applied. In this embodiment, t1 is set at a timing of arrival of the toner T, existing in the developing portion Nd at a stop of the drive, at the transfer nip Nt. That is, in this embodiment, t1 is a timing when a region on the photosensitive drum 1 positioned in the developing portion Nd at the stop of the drive at startup of the image forming apparatus 100 first reaches the transfer nip Nt. Further, in this embodiment, t2 is set at a timing of arrival of the toner T, existing in the blade nip Nb at the stop of the drive, at the transfer nip Nt. That is, in this embodiment, t2 is a timing when a region on the photosensitive drum 1 first contacting, in the developing portion Nd, a region on the developing roller 4*a* positioned in the blade nip Nb at the stop of the drive at startup of the image forming apparatus 100 first reaches the transfer nip Nt. By this, the toner T which is liable to transfer onto the photosensitive drum 1 at startup of the image forming apparatus 1 and which is positioned in a section from the region on the developing roller 4*a* positioned in the blade nip Nb at the stop of the drive to a region on the developing roller 4*a* positioned in the developing portion Nd at the stop of the drive can be transferred onto the transfer roller 5 as described later.

Incidentally, the above-described t1 and t2 may only be required to be set so as to include a timing when a part or all of a portion where the fog at startup on the photosensitive drum 1 occurs first passes through the transfer nip Nt. For example, a timing when the surface potential of the photosensitive drum 1 becomes indefinite and a portion on the photosensitive drum 1 positioned in the charging portion Nc at the stop of the drive first passes through the transfer nip Nt may be set at t2. That is, t2 may be a timing when the region on the photosensitive drum 1 positioned in the charging portion Nc at the stop of the drive first reaches the transfer nip Nt. By this, the toner T which transfers from the developing roller 4*a* at startup of the image forming apparatus 100 in some instances and which is positioned in a section from the region on the photosensitive drum 1 positioned in the charging portion Nc at the stop of the drive to the region on the photosensitive drum 1 positioned in the developing portion Nd at the stop of the drive can be transferred onto the transfer roller 5 as described later. Incidentally, in this embodiment, at startup of the image forming apparatus 100, the region on the developing roller 4*a* positioned in the blade nip Nb at the stop of the drive reaches the developing portion Nd earlier than the region on the photosensitive drum 1 positioned in the charging portion Nc at the stop of the drive reaches the developing portion Nd. Further, in consideration of responsiveness of the transfer power source 18, an interval from t1 to t2 may be made larger than the interval from t1 to t2 in this embodiment.

As can be understood from the electric charge distribution of the toner T on the photosensitive drum 1 indicated by the plot of "ON DRUM" in FIG. 5, the toner T on the photosensitive drum 1 is slightly charged to the negative polarity side. For that reason, in the case where the transfer voltage of the positive polarity is applied, most of the toner T is transferred from the photosensitive drum 1 onto the transfer roller 5. In this embodiment, when V0=+1000 V was set, about 80% of the fog toner T on the photosensitive drum 1 was transferred onto the transfer roller 5. Thus, an electrostatic force acts in a direction in which the fog toner T charged to the negative polarity side is attracted to the transfer roller 5, and therefore, the occurrence of the toner scattering is suppressed.

Part (d) of FIG. 4 shows a state in which the toner T transferred from the photosensitive drum 1 to the transfer roller 5 is gradually transferred from the transfer roller 5 onto the photosensitive drum 1. At this time, as shown in FIG. 3, in a period from t2 to 3, an absolute value of the transfer voltage is gradually increased (V1 to V8). By this, the toner T on the transfer roller 5 is gradually transferred onto the photosensitive drum 1. In this embodiment, t3 is a start timing of the normal print operation. In this embodiment, in the normal print operation, in a state in which the charging voltage and the developing voltage are applied and in which the transfer voltage is not applied (0 V), the photosensitive drum 1 is rotated for a predetermined period, and thereafter, image exposure by the exposure device 3 and application of the transfer voltage of the positive polarity are started.

Values of the transfer voltages V1 to V8 in this embodiment are shown in a table 1 appearing hereinafter. Further, a measuring result of the electric charge distribution of the toner T on the transfer roller 5 in the state of FIG. 4 is shown by a plot of "ON TRANSFER ROLLER" in FIG. 5. As shown by the slot of "ON TRANSFER ROLLER" in FIG. 5, a center value of the electric charge of the toner T on the transfer roller 5 is 4 μC/g, and thus is somewhat higher on the negative polarity side than the center value of the electric charge distribution of the toner T on the photosensitive drum 1 by the slide in the transfer nip Nt. The toner T on the transfer roller 5 has such an electric charge distribution, and therefore, in the case where the transfer voltage, such as V1, which is low in absolute value and which has the negative polarity is applied, only the toner T on the transfer roller 5 having a high electric charge on the negative polarity side is transferred onto the photosensitive drum 1, and another toner T remains on the transfer roller 5. By gradually increasing an absolute value of the transfer voltage of the negative polarity from V1 to V3 and V3 to V5, in the order from the toner T higher in electric charge on the negative polarity side to the toner T lower in electric charge on the negative polarity side, the toner T is transferred from the transfer roller 5 onto the photosensitive drum 1. Further, by changing the polarity of the transfer voltage from V1 to V2 and V3 to V4, the toner T existing in the electric charge distribution of the toner shown by the plot of "ON TRANSFER ROLLER" in FIG. 5 in which the polarity thereof is reversed to the positive polarity can also be transferred from the transfer roller 5 onto the photosensitive drum 1. Also, as regard the transfer voltage of the positive polarity, the absolute value thereof is gradually increased from V2 to V4 and V4 to V6.

In this embodiment absolute values of the voltage of the negative polarity and the positive polarity are gradually increased while alternately changing the polarity of the transfer voltage. However, for example, transfer voltages of the same polarity in a plurality of levels in which absolute values thereof are gradually increased in such a manner that the transfer voltage is changed from V1 to V3, from V3 to V2, and from V2 to V4 may be successively applied. Further, depending on the electric charge distribution of the toner which caused the fog at startup and which was transferred from the photosensitive drum 1 onto the transfer roller 5, in the period from t2 to t3, only the voltage of the negative polarity may be applied while gradually increasing the absolute value thereof.

By carrying out such control, it becomes possible to suppress the toner scattering by gradually transferring a small amount of the toner T from the transfer roller 5 to the photosensitive drum 1. When the toner T on the transfer roller 5 is transferred at a time by applying a high negative-polarity transfer voltage from the first, an inertial force exerted on the toner T becomes large, and repulsion between the toner T and the transfer roller 5 is induced, so that there is a liability that the toner scattering is worsened.

Incidentally, each of the transfer voltages with respective values applied in the period from t2 to t3 may preferably be applied for at least a time corresponding to one-full circumference of the transfer roller 5 (i.e., not less than the time corresponding to the one-full circumference and, for example, not more than a time corresponding to five-full circumferences, typically not less than a time correspondingly to three-full circumferences). By this, at each of the transfer voltages of the respective values, the toner T can be transferred from the transfer roller 5 to the photosensitive drum 1 with no localization with respect to a circumferential direction of the transfer roller 5.

TABLE 1

| (Embodiment 1) | | | | | | | |
|---|---|---|---|---|---|---|---|
| V1 | V2 | V3 | V4 | V5 | V6 | V7 | V8 |
| −200 | +200 | −500 | +500 | −1000 | +1000 | −1500 | +1500 |

Here, FIG. 6 is a timing chart, similar to the timing chart of FIG. 3, showing progression of a transfer voltage in a modified embodiment of this embodiment in transfer voltage control at startup the image forming apparatus 100 according to this embodiment. As shown in FIG. 6, even in the case where the transfer voltage is not applied in the period from t1 to t2 (V0=0 V), an effect of this embodiment is obtained. As described above using part (c) of FIG. 2, in the case where the transfer voltage is not applied, the toner scattering occurs, and in addition, a part of the toner T is transferred from the photosensitive drum 1 onto the transfer roller 5 by the non-electrostatic depositing force. In the constitution of this embodiment, in the case of V0=0 V, about 30% of the toner T was transferred from the photosensitive drum 1 onto the transfer roller 5. In the case where the transfer voltage control at startup of the image forming apparatus 100 according to the present invention is not carried out, the toner T transferred to the transfer roller 5 is repetitively slid in the transfer nip Nt, whereby the toner scattering is worsened. However, by carrying out the transfer voltage control at startup the image forming apparatus 100 according to the present invention as shown in FIG. 6, the toner T on the transfer roller 5 is gradually transferred onto the photosensitive drum 1, so that it becomes possible to suppress second and subsequent toner scattering from the transfer nip Nt. However, when the transfer voltage of the opposite polarity (positive polarity in this embodiment) to the normal charge polarity of the toner in the period from t1 to t2 as shown in FIG. 3, an amount of the toner transferred from the photosensitive drum 1 onto the transfer roller 5 becomes large when the fog toner T first passes through the transfer nip Nt. For that reason, this case is preferred from a viewpoint of suppress in toner scattering.

(4) Functional Effect of this Embodiment

An evaluation experiment in which an effect of this embodiment was checked will be described. The evaluation experiment was conducted for this embodiment (embodiment 1), and comparison examples 1 and 2 in which the toner scattering suppressing control in this embodiment was not executed.

In this embodiment, in the pre-rotation operation at startup of the image forming apparatus 100, the transfer voltage control (toner scattering suppressing control) described using FIGS. 3 and 6 was executed. That is, in this embodiment, 0 V or +1000 V was used as V0, and the values of the table 1 were used as V1 to V8.

In the comparison example 1, in the pre-rotation operation at startup of the image forming apparatus 100, the transfer voltage control shown in FIG. 7 was executed. That is, in the comparison example 1, the transfer voltage was not applied during the pre-rotation operation at startup of the image forming apparatus 100, and the transfer voltage in a period from t1 to t3 was set at 0 V.

In the comparison example 2, in the pre-rotation operation at startup of the image forming apparatus 100, the transfer voltage control shown in FIG. 8 was executed. That is, in the comparison example 2, a transfer voltage V9 of the negative polarity was applied during the pre-rotation operation at startup of the image forming apparatus 100, and the transfer voltage in a period from t1 to t3 was set at V0=−1000 V.

Incidentally, each of FIGS. 7 and 8 is a timing chart showing progression of the transfer voltage similar to the progression shown in FIG. 3. Further, a constitution of an image forming apparatus 100 in each of the comparison examples 1 and 2 is substantially the same as the constitution of the image forming apparatus of this embodiment (embodiment 1) except that the transfer voltage control at startup of the image forming apparatus 100 is different from the transfer voltage control in the embodiment 1.

The evaluation experiment was conducted in the following manner. As the recording material P, LTR-size paper ("Vitality", basis weight: 75 g/$m^2$, manufactured by Xerox Corp.) was used. The image forming apparatus 100 was installed in an environment of 23° C. in temperature and 50% RH in relative humidity. For each of this embodiment (embodiment 1), the comparison example 1, and the comparison example 2, a cycle in which images were printed on 2 sheets after a lapse of 12 hours from a last print operation end was repeated 10 times. Thus, small-number printing after the lapse of the long time was repeated, and then, contamination of the discharging needle 20 and the feeding guide 11 with toner ("discharging needle/feeding guide contamination") and paper trailing end contamination due to deposition of the toner on a printed product at a trailing end of the recording material P ("PTE toner deposition") were checked.

A result of the evaluation experiment is shown in a table 2 below. As regards the discharging needle/feeding guide contamination, the case where the contamination occurred was evaluated as x (poor), the case where the contamination was slightly deposited on the discharging needle (feeding guide) was evaluated as Δ (fair), and the case where the contamination did not occur was evaluated as ○ (good). Further, as regards the paper trailing end toner deposition, the case where the toner deposition occurred was evaluated as x (poor), the case where the toner was slightly deposited was evaluated as Δ (fair), and the case where the toner deposition did not occur was evaluated as ○ (good).

TABLE 2

| | | DN/FGC*[1] | PTETD*[2] |
|---|---|---|---|
| COMP. EX. 1 | | x | x |
| COMP. EX. 2 | | x | x |
| EMB. 1 | V0 = 0 V | Δ | Δ |
| | V0 = +1000 V | ○ | ○ |

*[1]"DN/FGC" is the discharging needle/feeding guide contamination.
*[2]"PTETD" is the paper trailing end toner deposition.

In the embodiment 1, both the discharging needle/feeding guide contamination and the paper trailing end toner deposition occurred. This is because the fog toner of which electric charge is attenuated by the lapse of the long time is scattered by the slide in the transfer nip Nt. Further, also, in the comparison example 2, both the discharging needle/feeding guide contamination and the paper trailing end toner deposition occurred. This is due to that in addition to the slide of the fog toner in the transfer nip Nt, the toner slightly charged to the negative polarity side is repelled by the transfer roller 5 to which the voltage of the negative polarity is applied, and thus the toner is scattered.

In this embodiment, in the case of V0=0 V, although both the discharging needle/feeding guide contamination and the paper trailing end toner deposition slightly occurred, but this result is better than the results of the comparison example 1 and the comparison example 2. This is because the toner scattering occurs when the fog toner is slid in the transfer nip Nt at a first time, but when the fog toner is slid in the transfer nip Nt at a second time and later, an effect of this embodiment such that the toner on the transfer roller 5 is gradually transferred onto the photosensitive drum 1 and thus the amount thereof is gradually decreased is achieved.

In this embodiment, in the case of V0=+1000 V, both the discharging needle/feeding guide contamination and the paper trailing end toner deposition did not occur, so that a best result was obtained in the above-described evaluation experiment. This is because even when the fog toner is slid in the transfer nip Nt at the first time, the fog toner on the photosensitive drum 1 slightly charged to the negative polarity side in the developing portion Nd is transferred onto the transfer roller 5 while receiving the electrostatic force by which the fog toner is attracted to the transfer roller 5 and thus the toner scattering does not readily occur. Further, also, when the fog toner is slid in the transfer nip Nt at the second time and later, the effect of this embodiment such that the toner on the transfer roller 5 is gradually transferred onto the photosensitive drum 1 and thus the amount thereof is gradually decreased is achieved.

Thus, in this embodiment, the image forming apparatus 100 includes the rotatable photosensitive member 1; the charging means 2 for electrically charging the photosensitive member 1 at the charging portion Nc; the rotatable developing member 4*a* for supplying toner to the photosensitive member 1, charged by the charging means 2, in contact with the photosensitive member 1 at the developing portion Nd; the regulating member 4*b* for imparting the electric charge to the toner on the developing member 1 in contact with the developing member 4*a* at the regulating portion Nb; the transfer member 5 forming a transfer portion in contact with the photosensitive member and for transferring the toner from the photosensitive member 1 onto a recording material P passing through the transfer portion Nt; the transfer voltage applying means 18 for applying a voltage to the transfer member 5; and the control means 50 capable of controlling the transfer voltage applying means 18. The rotation of the photosensitive member 1 and the developing member 4*a* is started in a state in which the photosensitive member 1 and the developing member 4*a* are in contact with each other. Further, in this embodiment, the region on the photosensitive member 1 positioned at the developing portion Nd during a stop of the rotation of the photosensitive member 1 and the developing member 4*a* is defined as a first region, and a region on the photosensitive member 1 first contacting, at the developing portion Nd, a region on the developing member 4*a* positioned at the regulating portion Nb during the stop of the rotation of the photosensitive member 1 and the developing member 4*a* after the rotation of the photosensitive member 1 and the developing member 4*a* is started is defined as a second region. The control means 50 controls the transfer voltage applying means 18 so that the voltage is not applied to the transfer member 5 or a voltage of an opposite polarity to the normal charge polarity of the toner is applied to the transfer member 5, in a first period including at least a period, after the rotation of the photosensitive member 1 and the developing member 4*a* is started, from first arrival of the first region at the transfer portion Nt to first arrival of the second region at the transfer portion Nt, and so that at least a first voltage of the same polarity as the normal charge polarity and a second voltage which is of the same polarity as the first voltage and which is larger in absolute value than the first voltage and applied to the transfer member 5 after the first period and in a second period in which a toner image formed on the photosensitive member 1 reaches the transfer portion Nt.

In a preferred embodiment, the control means 50 controls the transfer voltage applying means 18 so as to apply the voltage opposite to the normal charge polarity to the transfer member 5 in the first period. Further, in a preferred embodiment, the first period is set so as to include the period, after the rotation of the photosensitive member 1 and the developing member 4*a* is started, from first arrival of the first region at the transfer portion Nt to first arrival of the second region at the transfer portion Nt. Further, when a region on the photosensitive member positioned at the charging portion Nc during the stop of the rotation of the photosensitive member 1 and the developing member 4*a* is defined as a third region, the first period may be set so as to include a period, after the rotation of the photosensitive member 1 and the developing member 4*a* is started, from first arrival of the first region at the transfer portion Nt to first arrival of the third region at the transfer portion Nt. Further, in this embodiment, the control means 50 controls the transfer voltage applying means 18 so as to apply, to the transfer member 5 in the second period, a third voltage of the opposite polarity to the normal charge polarity and a fourth voltage which is of the same polarity as the third voltage and which is larger in absolute value than the third voltage. Further, in this embodiment, the control means 50 controls the transfer voltage applying means 18 so as to alternately apply, to the transfer member 5 in the second period, a voltage of the same polarity as the normal charge polarity and the voltage opposite to the normal charge polarity.

As described above, according to this embodiment, it becomes to suppress the toner scattering from the transfer nip Nt due to the fog at startup when the image forming apparatus 100 is started up in a state in which the developing roller 4*a* and the photosensitive drum 1 are in contact with each other after the lapse of the long time from the last print operation end. As a result, also in the image forming apparatus 100 provided with no contact and separation mechanism for switching contact of the developing roller 4*a* with the photosensitive drum 1 and separation of the developing roller 4*a* from the photosensitive drum, it is possible to suppress the contamination of the discharging needle 20 and the feeding guide 11 with the toner and the paper trailing end contamination with the toner. That is, according to this embodiment, it is possible to suppress the toner scattering caused by the toner which caused the fog at startup of the image forming apparatus 100.

(5) Another Embodiment of this Embodiment

FIG. 9 is a schematic sectional view of an image forming apparatus 100 of another embodiment (form) of this embodiment. A difference from the image forming apparatus 100 shown in FIG. 1 is that the cleaning device 6 is not provided and that the developing device 4 also functions as the cleaning mechanism (cleaner-less constitution). Other constitutions of the image forming apparatus 100 shown in FIG. 9 are substantially the same as those of the image forming apparatus 100 shown in FIG. 1.

Also, in the image forming apparatus 100 with the cleaner-less constitution as shown in FIG. 9, it is possible to use the toner scattering suppressing control (the transfer voltage control at startup of the image forming apparatus 100) in this embodiment.

That is, in the case where the transfer voltage control at startup of the image forming apparatus 100 in this embodiment is used, the toner transferred from the photosensitive drum 1 to the transfer roller 5 is stepwise returned to the photosensitive drum 1. In this toner returned to the photosensitive drum 1, in addition to the toner with the negative polarity, the zero triboelectric toner and toner of which polarity is reversed to the positive polarity are contained.

In the image forming apparatus 100 with the cleaner-less constitution shown in FIG. 9, the toner with the negative polarity deposited on the dark-portion potential portion on the photosensitive drum 1 is collected in the developing device 4 at the developing portion Nd. At this time, the zero triboelectric toner and the toner with the positive polarity cannot be collected, and therefore, there is a need to such toner to be charged to the negative polarity. In the image forming apparatus 100 in FIG. 9, during the pre-rotation operation (during the cleaning operation of the photosensitive drum 1), to the charging roller 2, −1100 V which is the charging voltage equal to the charging voltage during the normal image forming operation is applied, so that electric discharge generates between the charging roller 2 and the photosensitive drum 1. By this electric discharge, the polarity of the fog toner on the photosensitive drum 1 is changed to the negative polarity, so that the fog toner can be collected at the developing portion Nd.

Thus, irrespective of the cleaning type of the image forming apparatus 100, it is possible to use the toner scattering suppressing control in this embodiment.

Next, another embodiment (embodiment 2) of the present invention will be described. Basic constitution and operation of an image forming apparatus of this embodiment are the same as of the image forming apparatus 100 in the embodiment 1. Accordingly, in the image forming apparatus of this embodiment, elements having the same or corresponding functions or constitutions to those of the image forming apparatus 100 in the embodiment 1 will be omitted from detailed description by adding the same reference numeral or symbols as those in the embodiment 1.

In this embodiment, depending on a history of a last print operation, the image forming apparatus 100 determines whether or not the toner scattering suppressing control described in the embodiment 1 should be performed. When the toner scattering suppressing control described in the embodiment 1 is performed every time when the image forming apparatus 100 is started up, there are possibilities that a startup time increases and that the toner scattering suppressing control has the influence on a lifetime of the members. For that reason, in this embodiment, the toner scattering suppressing control is executed only in a situation such that necessity to execute the toner scattering suppressing control is high, so that the above-described possibilities are reduced.

A table 3 below is an evaluation result of the paper trailing end toner deposition for each of elapsed times from the last print operation end. The transfer voltage control at startup of the image forming apparatus 100 in each of the above-described embodiment 1 (V0=+1000 V) and the above-described comparison example 1 was executed every time when the image forming apparatus 100 was started up. In this case, the elapsed time from the last print operation end was changed to three levels of 1 hour, 6 hours, and 12 hours.

Other conditions of the evaluation experiment are the same as those of the evaluation experiment from which the result of the table 2 was obtained, but in this embodiment, only the paper trailing end toner deposition is evaluated. The case where the paper trailing end toner deposition occurred was evaluated as x (poor), the case where the toner was slightly deposited was evaluated as Δ (fair), and the case where the paper trailing end toner deposition did not occur was evaluated as ○ (good).

TABLE 3

| | ETFLPO*[1] (hours) | | |
|---|---|---|---|
| PTETD*[2] | 1 | 6 | 12 |
| EMB. 1*[3] | ○ | ○ | ○ |
| COMP. EX. 1*[4] | ○ | Δ | x |

*[1]"ETFLPO" is the elapsed time from the last print operation.
*[2]"PTETD" is the paper trailing end toner deposition.
*[3]"EMB. 1" shows that the control in the embodiment 1 is executed every time at startup of the image forming apparatus.
*[4]"COMP. EX. 1" shows that the control in the comparison example 1 is executed every time at startup of the image forming apparatus.

In the case where the transfer voltage control at startup of the image forming apparatus 100 in the embodiment 1 is executed every time when the image forming apparatus 100 is started up, a degree of the paper trailing end toner deposition becomes a good result irrespective of the elapsed time from the last print operation end.

On the other hand, in the case where the transfer voltage control at startup of the image forming apparatus 100 in the comparison example 1 is executed every time when the image forming apparatus 100 is started up, the degree of the paper trailing end toner deposition was poor as described above when 12 hours has elapsed from the last print operation end. However, with a decreasing elapsed time from the last print operation end such that the elapsed time is decreased to 6 hours and then to 1 hour, the result is improved.

This is because when the elapsed time from the last print operation end is short, the electric charge of the toner on the developing roller 4*a* is kept negative, and in addition, the surface potential of the photosensitive drum 1 is not completely attenuated, and therefore, the fog toner itself at startup of the image forming apparatus becomes small in amount. FIG. 10 is a graph showing a measurement result of the electric charge distribution of the toner on the developing roller 4*a* in the case where the elapsed time from the last print operation end is changed. From FIG. 10, it is understood that with a shorter elapsed time, a larger electric charge amount of the toner is maintained on the negative polarity side in terms of an absolute value. Thus, the fog toner itself at startup of the image forming apparatus becomes small in amount, so that the toner scattering from the transfer nip Nt also becomes small. For that reason, in such a case, the degree of the paper trailing end toner deposition is improved even when the toner scattering suppressing control described in the embodiment 1 is not executed.

A table 4 below is an evaluation result of the paper trailing end toner deposition for each of the number of passed sheets in the last print operation. The transfer voltage control at startup of the image forming apparatus 100 in each of the above-described embodiment 1 (V0=+1000 V) and the above-described comparison example 1 was executed every time when the image forming apparatus 100 was started up. In this case, the number of passed sheets in the last print operation was changed to three levels of 2 sheets, 5 sheets and 10 sheets. Other conditions of the evaluation experiment are the same as those of the evaluation experiment from which the result of the table 2 was obtained, but in this embodiment, only the paper trailing end toner deposition is evaluated. The case where the paper trailing end toner deposition occurred was evaluated as x (poor), the case where the toner was slightly deposited was evaluated as Δ (fair), and the case where the paper trailing end toner deposition did not occur was evaluated as ○ (good).

TABLE 4

| | NPSDLPO*[1] (sheets) | | |
|---|---|---|---|
| PTETD*[2] | 2 | 5 | 10 |
| EMB. 1*[3] | ○ | ○ | ○ |
| COMP. EX. 1*[4] | x | Δ | ○ |

*[1]"NPSDLPO" is the number of passed sheets during the last print operation.
*[2]"PTETD" is the paper trailing end toner deposition.
*[3]"EMB. 1" shows that the control in the embodiment 1 is executed every time at startup of the image forming apparatus.
*[4]"COMP. EX. 1" shows that the control in the comparison example 1 is executed every time at startup of the image forming apparatus.

In the case where the transfer voltage control at startup of the image forming apparatus 100 in the embodiment 1 is executed every time when the image forming apparatus 100 is started up, a degree of the paper trailing end toner deposition becomes a good result irrespective of the number of passed sheets in the last print operation.

On the other hand, in the case where the transfer voltage control at startup of the image forming apparatus 100 in the comparison example 1 is executed every time when the image forming apparatus 100 is started up, the degree of the paper trailing end toner deposition was poor as described above when the number of passed sheets in print operation is 2 sheets. However, with an increasing number of passed sheets in the last print operation such that the number of passed sheets is increased to 6 sheets and then to 10 sheets, the result is improved.

This is because with the increasing number of passed sheets, the toner deposited on the feeding guide 11 by the toner scattering due to the fog at startup is deposited on the recording material P in an amount visually unrecognizable and then is gradually discharged, and thus the amount of the toner deposited on the feeding guide 11 decreases. Thus, even in the case where the toner scattering occurred, when the contamination of the feeding guide 11 with the toner is in a situation that the contamination is gradually removed from the feeding guide 11 by passing of the paper (recording material P), the degree of the paper trailing end toner deposition is improved even when the toner scattering suppressing control described in the embodiment 1 is not executed.

Next, procedure of the transfer voltage control at startup of the image forming apparatus 100 in this embodiment in which the results of the table 3 and the table 4 are taken into consideration. FIG. 11 is a flowchart showing the procedure of the transfer voltage control at startup of the image forming apparatus 100 in this embodiment.

When the controller 50 receives a print signal from the host computer, before a startup operation of the image forming apparatus 100 is started, the controller 50 discriminates whether or not the elapsed time from the last print operation end is 6 hours or more (predetermined threshold or more) (S101). Incidentally, the controller 50 measures, for example, a time from the end of the print operation to reception of the print signal and then can make discrimination of S101 on the basis of a measurement result thereof.

Or, the controller 50 causes the storing means such as the non-volatile memory to store the date and time of the print operation end, and then can make discrimination of S101 on the basis of the stored date and time and the date and time of the reception of the print signal.

In the case where the elapsed time from the last print operation end is less than 6 hours, even when the normal startup operation is performed, an amount of occurrence of the fog at startup is small, so that an occurrence risk of the toner scattering from the transfer nip Nt is low. For that reason, in the case where the controller 50 discriminated in S101 that the elapsed time is less than 6 hours ("No"), the controller 50 causes the image forming apparatus 100 to execute the normal print operation without executing the toner scattering suppressing control (S104), and then ends the print operation when a designated image forming operation is ended.

In the case where the elapsed time from the last print operation end is 6 hours or more, the amount of occurrence of the fog at startup becomes large, so that the occurrence risk of the toner scattering from the transfer nip Nt increases. For that reason, in the case where the controller 50 discriminated in S101 that the elapsed time is 6 hours or more ("Yes"), the controller 50 then discriminates whether or not the number of passed sheets in the last print operation (number of printed sheets) is 5 sheets or less (predetermined threshold or less) (S102).

In the case where the number of passed sheets in the last print operation is 6 sheets or more, even when the normal startup operation is performed, the contamination of the feeding guide 11 with the toner is gradually discharged by the paper passing, and therefore, an occurrence risk of the paper trailing end contamination is low. For that reason, in the case where the controller 50 discriminated in S102 that the number of passed sheets is 6 sheets or more ("No"), the controller 50 causes the image forming apparatus 100 to execute the normal print operation without executing the toner scattering suppressing control (S104), and then ends the print operation when a designated image forming operation is ended.

Then, in the case where the controller 50 discriminated in S102 that the number of passed sheets is 5 sheets or less ("Yes"), the controller 50 causes the image forming apparatus 100 to execute the toner scattering suppressing operation, described in the embodiment 1, in the pre-rotation operation at startup of the image forming apparatus 100 (S103). Thereafter, the controller 50 causes the image forming apparatus 100 to execute the normal print operation (S104) and then to end the print operation after the designated image forming operation is ended.

Incidentally, in this embodiment, both the discrimination as to execution or non-execution of the toner scattering suppressing operation based on the elapsed time from the last print operation end in S101 and the discrimination as to execution or non-execution of the toner scattering suppressing operation based on the number of passed sheets in the last print operation in S102 were performed. However, as regards these discriminations of S101 and S102 in this embodiment, either one of the discriminations may be executed (for example, only the discrimination of S101 may be executed). Also, in that case, compared with the embodiment 1, it is possible to reduce the possibilities that the startup time increases and that the toner scattering suppressing control has the influence on the life time of the members.

Thus, in this embodiment, on the basis of information on an operation history of the image forming apparatus 100, the control means 50 carries out control so as to be capable of selectively executing, first control in which the control (toner scattering suppressing control) of the transfer voltage applying means 18 in each of the first period and the second period is executed in an operation period from the start of the rotation of the photosensitive member 1 and the developing member 4*a* to arrival of the toner image, formed on the photosensitive member 1, to the transfer portion Nt, and second control in which the control (toner scattering suppressing control) of the transfer voltage applying means 18 in each of the first period and the second period is not executed and in which the operation period is shorter than the operation period in a case that the first control is executed. In this embodiment, the control means 50 controls the transfer voltage applying means 18 so that the voltage first applied to the transfer member 5 in the operation period in the second control is the voltage of the opposite polarity to the normal charge polarity of the toner. Further, the information on the operation history may be information on a stop period of the rotation of the photosensitive member 1 from an end of a last print operation. Further, the information on the operation history may be information on the number of printed sheets in a last print operation.

As described above, in this embodiment, the toner scattering suppressing control described in the embodiment 1 is executed at startup of the image forming apparatus 100 only in a situation that necessity is high. As a result, it becomes possible to shorten the time of the pre-rotation operation at startup of the image forming apparatus 100 and to reduce the possibility which has the influence on the life time of the members under application of the transfer voltage in a state in which there is no recording material P in the transfer nip Nt, (such as surface layer abrasion of the photosensitive drum, increase in resistance of the transfer roller 5).

As described above, although the present invention was described based on the specific embodiments, the present invention is not limited to the above-described embodiments.

The transfer member is not limited to the roller-shaped member, but may also be a block (pad)-shaped member, a brush-shaped member, or a sheet (film)-shaped member.

Further, the image forming apparatus may also be from among image forming apparatuses for various uses, such as printers, various printing machines, copying machines, facsimile machines, multi-function machines, and the like.

According to the present invention, it is possible to suppress the toner scattering caused by the toner which caused the fog at startup of the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-152041 filed on Sep. 24, 2022, which is hereby incorporated by reference herein in its entirety.

What is claimed is:

1. An image forming apparatus comprising:

a rotatable photosensitive member;

a charging member configured to electrically charge the photosensitive member at a charging portion;

a rotatable developing member configured to supply toner to the photosensitive member, charged by the charging member, in contact with the photosensitive member at a developing portion;

a regulating member configured to impart an electric charge to the toner on the developing member in contact with the developing member at a regulating portion;

a transfer member forming a transfer portion in contact with the photosensitive member and configured to transfer the toner from the photosensitive member onto a recording material passing through the transfer portion;

a transfer voltage applying portion configured to apply a voltage to the transfer member; and a controller capable of controlling the transfer voltage applying portion, wherein rotation of the photosensitive member and the developing member is started in a state in which the photosensitive member and the developing member are in contact with each other, wherein a region on the photosensitive member positioned at the developing portion during a stop of the rotation of the photosensitive member and the developing member is defined as a first region, and a region on the photosensitive member first contacting, at the developing portion, a region on the developing member positioned at the regulating portion during the stop of the rotation of the photosensitive member and the developing member after the rotation of the photosensitive member and the developing member is started is defined as a second region, wherein the controller controls the transfer voltage applying portion:

so that the voltage is not applied to the transfer member, or a voltage of an opposite polarity to a normal charge polarity of the toner is applied to the transfer member, in a first period including at least a period, after the rotation of the photosensitive member and the developing member is started, from first arrival of the first region at the transfer portion to first arrival of the second region at the transfer portion, and so that at least a first voltage of the same polarity as the normal charge polarity and a second voltage which is of the same polarity as the first voltage and which is greater in absolute value than the first voltage are applied to the transfer member in a second period after the first period and before a toner image formed on the photosensitive member reaches the transfer portion, and wherein the first period includes the period, after the rotation of the photosensitive member and the developing member is started, from first arrival of the first region at the transfer portion to first arrival of the second region at the transfer portion.

2. An image forming apparatus according to claim 1, wherein the controller controls the transfer voltage applying portion so as to apply the voltage of the opposite polarity to the normal charge polarity to the transfer member in the first period.

3. An image forming apparatus according to claim 1, wherein a region on the photosensitive member positioned at the charging portion during the stop of the rotation of the photosensitive member and the developing member is defined as a third region, and wherein the first period includes a period, after the rotation of the photosensitive member and the developing member is started, from first arrival of the first region at the transfer portion to first arrival of the third region at the transfer portion.

4. An image forming apparatus according to claim 1, wherein the controller controls the transfer voltage applying portion so as to apply, to the transfer member in the second period, a third voltage of the opposite polarity to the normal charge polarity and a fourth voltage which is of the same polarity as the third voltage and which is greater in absolute value than the third voltage.

5. An image forming apparatus according to claim 4, wherein the controller controls the transfer voltage applying portion so as to alternately apply, to the transfer member in the second period, the voltage of the same polarity as the normal charge polarity and the voltage of the opposite polarity to the normal charge polarity.

6. An image forming apparatus according to claim 1, wherein on the basis of information on an operation history of the image forming apparatus, the controller carries out control so as to be capable of selectively executing:

first control in which the control of the transfer voltage applying portion in each of the first period and the second period is executed in an operation period from the start of the rotation of the photosensitive member and the developing member to arrival of the toner image, formed on the photosensitive member, to the transfer portion, and second control in which the control of the transfer voltage applying portion in each of the first period and the second period is not executed in the operation period and in which the operation period is shorter than the operation period in a case that the first control is executed.

7. An image forming apparatus according to claim 6, wherein the controller controls the transfer voltage applying portion so that the voltage first applied to the transfer member in the operation period in the second control is the voltage of the opposite polarity to the normal charge polarity.

8. An image forming apparatus according to claim 6, wherein the information on the operation history is information on a stop time of the rotation of the photosensitive member from an end of a last print operation.

9. An image forming apparatus according to claim 6, wherein the information on the operation history is information on a number of printed sheets in a last print operation.

10. An image forming apparatus comprising:

a rotatable photosensitive member;

a charging member configured to electrically charge the photosensitive member at a charging portion;

a rotatable developing member configured to supply toner to the photosensitive member, charged by the charging member, in contact with the photosensitive member at a developing portion;

a regulating member configured to impart an electric charge to the toner on the developing member in contact with the developing member at a regulating portion;

a transfer member forming a transfer portion in contact with the photosensitive member and configured to transfer the toner from the photosensitive member onto a recording material passing through the transfer portion;

a transfer voltage applying portion configured to apply a voltage to the transfer member; and a controller capable of controlling the transfer voltage applying portion, wherein rotation of the photosensitive member and the developing member is started in a state in which the photosensitive member and the developing member are in contact with each other, wherein a region on the photosensitive member positioned at the developing portion during a stop of the rotation of the photosensitive member and the developing member is defined as a first region, and a region on the photosensitive member first contacting, at the developing portion, a region on the developing member positioned at the regulating portion during the stop of the rotation of the photosensitive member and the developing member after the rotation of the photosensitive member and the developing member is started is defined as a second region, wherein the controller controls the transfer voltage applying portion:

so that the voltage is not applied to the transfer member or a voltage of an opposite polarity to a normal charge polarity of the toner is applied to the transfer member, in a first period including at least a period, after the rotation of the photosensitive member and the developing member is started, from first arrival of the first region at the transfer portion to first arrival of the second region at the transfer portion, and so that at least a first voltage of the same polarity as the normal charge polarity and a second voltage which is of the same polarity as the first voltage and which is greater in absolute value than the first voltage are applied to the transfer member in a second period after the first period and before a toner image formed on the photosensitive member reaches the transfer portion, and wherein the controller controls the transfer voltage applying portion so as to apply the voltage of the opposite polarity to the normal charge polarity to the transfer member in the first period.

* * * * *